(12) United States Patent
Oikawa et al.

(10) Patent No.: US 12,554,635 B2
(45) Date of Patent: Feb. 17, 2026

(54) DATA COMPRESSION CIRCUIT, MEMORY SYSTEM AND METHOD FOR CONTROLLING THE DATA COMPRESSION CIRCUIT

(71) Applicant: Kioxia Corporation, Tokyo (JP)

(72) Inventors: Kohei Oikawa, Kanagawa (JP); Sho Kodama, Kanagawa (JP); Daisuke Yashima, Tokyo (JP); Youhei Fukazawa, Kanagawa (JP); Masato Sumiyoshi, Kanagawa (JP); Keiri Nakanishi, Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/828,004

(22) Filed: Sep. 9, 2024

(65) Prior Publication Data

US 2025/0284632 A1    Sep. 11, 2025

(30) Foreign Application Priority Data

Mar. 11, 2024  (JP) ................. 2024-036933

(51) Int. Cl.
   *G06F 12/02*       (2006.01)
(52) U.S. Cl.
   CPC ................. *G06F 12/0246* (2013.01)
(58) Field of Classification Search
   CPC ......... G06F 12/0246; G06F 2212/7201; G06F 2212/1044; G06F 12/1009; G06F 2212/7205; G06F 3/0679; G06F 2212/1016; G06F 3/0608; G06F 3/0659; G06F 2212/7203; G06F 3/0604
   See application file for complete search history.

(56) References Cited

U.S. PATENT DOCUMENTS

| | | | |
|---|---|---|---|
| 6,268,809 B1 | 7/2001 | Saito | |
| 7,526,607 B1 * | 4/2009 | Singh | G06F 12/0866 711/216 |
| 7,747,821 B1 * | 6/2010 | Singh | G06F 12/0862 711/E12.071 |
| 2007/0146173 A1 | 6/2007 | Sakaguchi | |
| 2014/0156790 A1 | 6/2014 | Gopal et al. | |
| 2017/0070244 A1 * | 3/2017 | Nakanishi | G06F 3/064 |
| 2021/0089501 A1 * | 3/2021 | Patel | G06F 16/90335 |

(Continued)

OTHER PUBLICATIONS

R. J. Zito-Wolf, "A Broadcast/Reduce Architecture for High-Speed Data Compression", Proceedings of the Second IEEE Symposium on Parallel and Distributed Processing 1990, 1990, pp. 174-181, DOI: 10.1109/SPDP.1990.143529.

*Primary Examiner* — Tasnima Matin
(74) *Attorney, Agent, or Firm* — Maier & Maier, PLLC

(57) ABSTRACT

According to one embodiment, a data compression circuit includes a plurality of intermediate match candidate generation circuits. Each of the plurality of intermediate match candidate generation circuits generates an intermediate match candidate by incrementing, based on a match length received from a corresponding intermediate match candidate selection circuit, a match length corresponding to an intermediate match candidate generated in a previous cycle when a distance corresponding to the received match length matches a distance corresponding to the intermediate match candidate generated in the previous cycle and the received match length is greater than a threshold value.

16 Claims, 15 Drawing Sheets

(56) References Cited

U.S. PATENT DOCUMENTS

| | | | | |
|---|---|---|---|---|
| 2023/0070623 A1* | 3/2023 | Yashima | ............. | H03M 7/3088 |
| 2023/0131251 A1* | 4/2023 | Edo Vivancos | ...... | G06F 3/0608 |
| | | | | 711/170 |
| 2023/0403027 A1* | 12/2023 | Nakanishi | ........... | H03M 7/6023 |

* cited by examiner

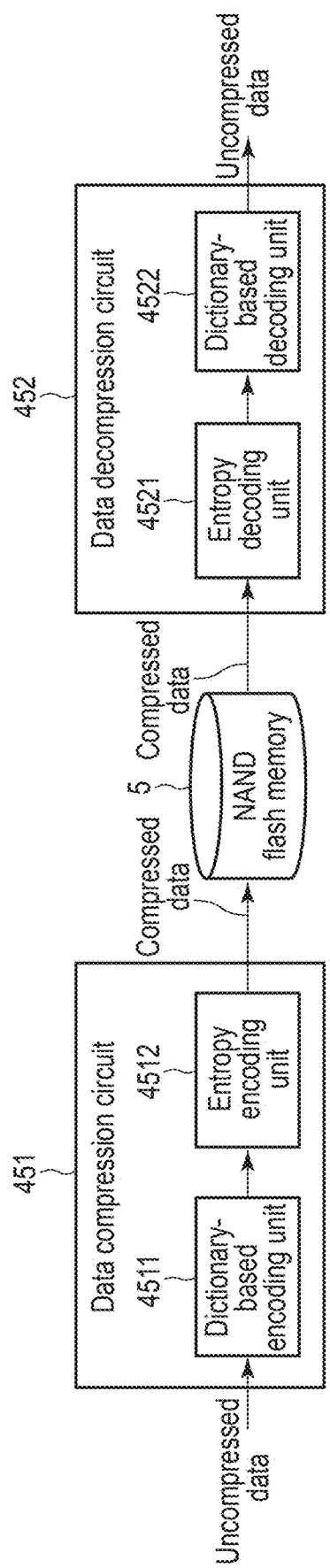
F I G. 2

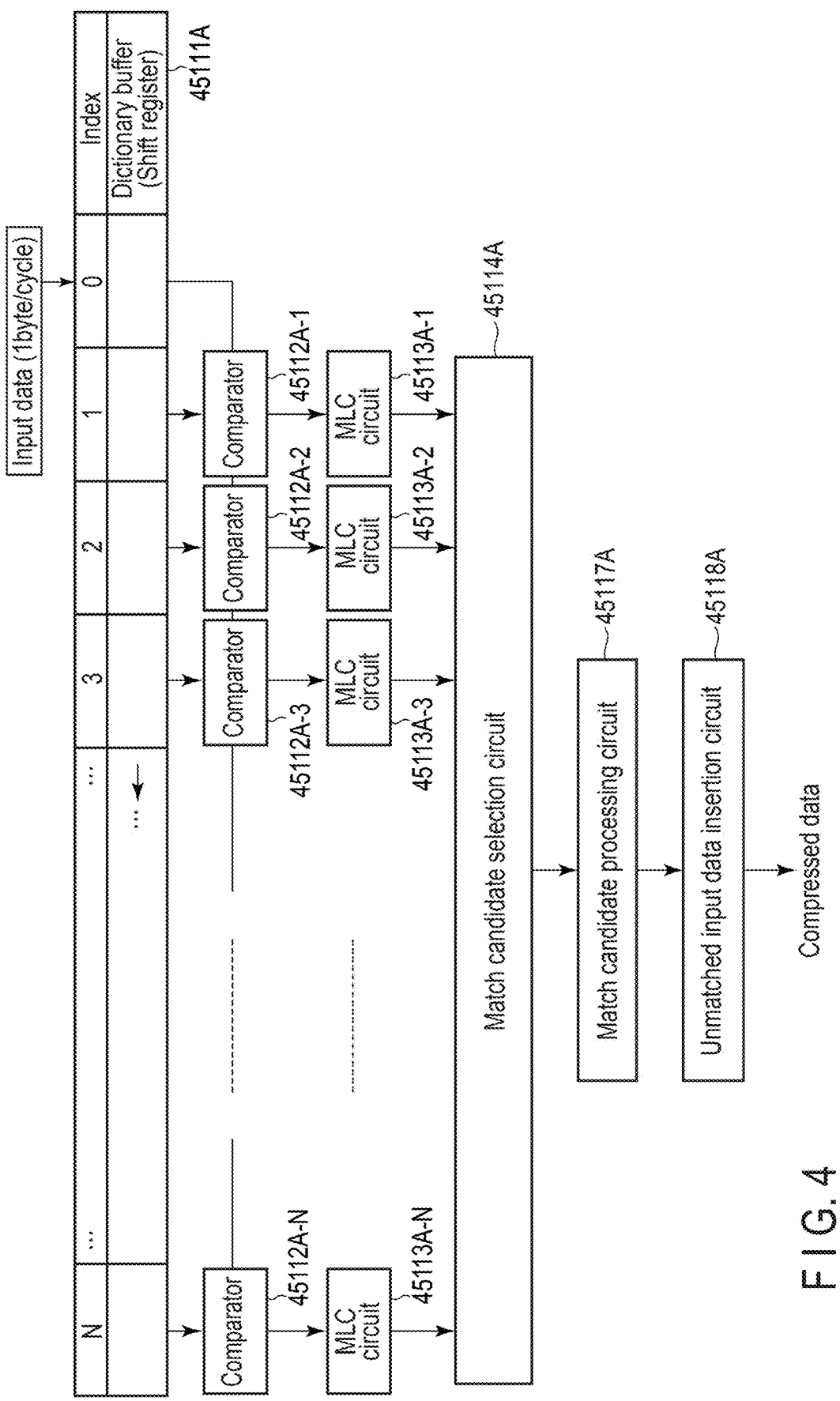
F I G. 4

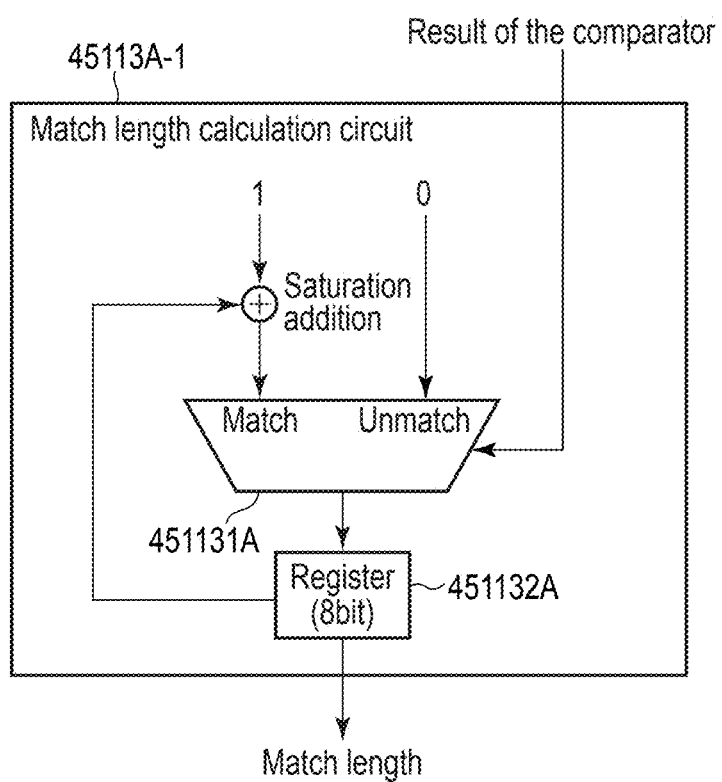
F I G. 5

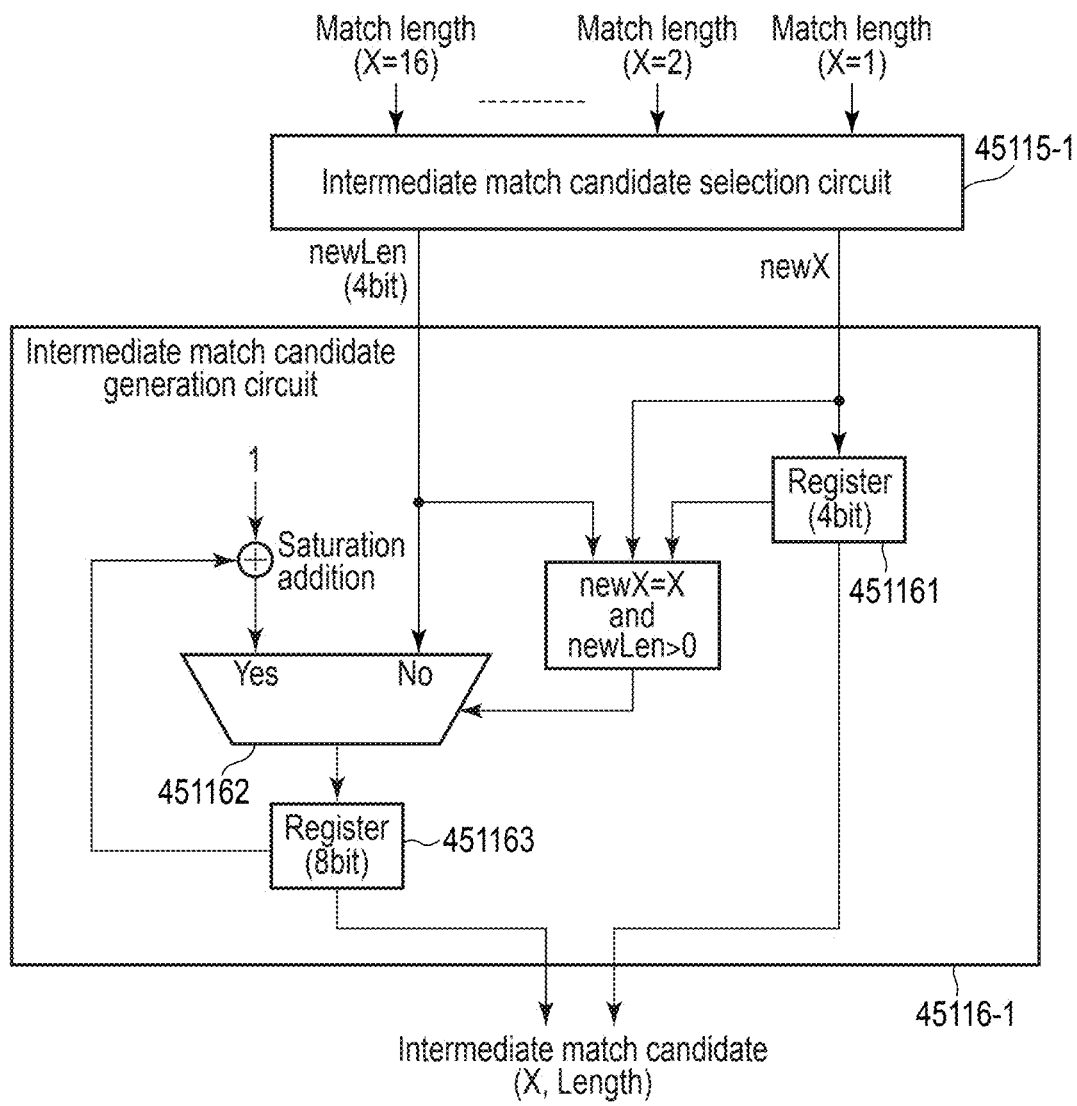
F I G. 7

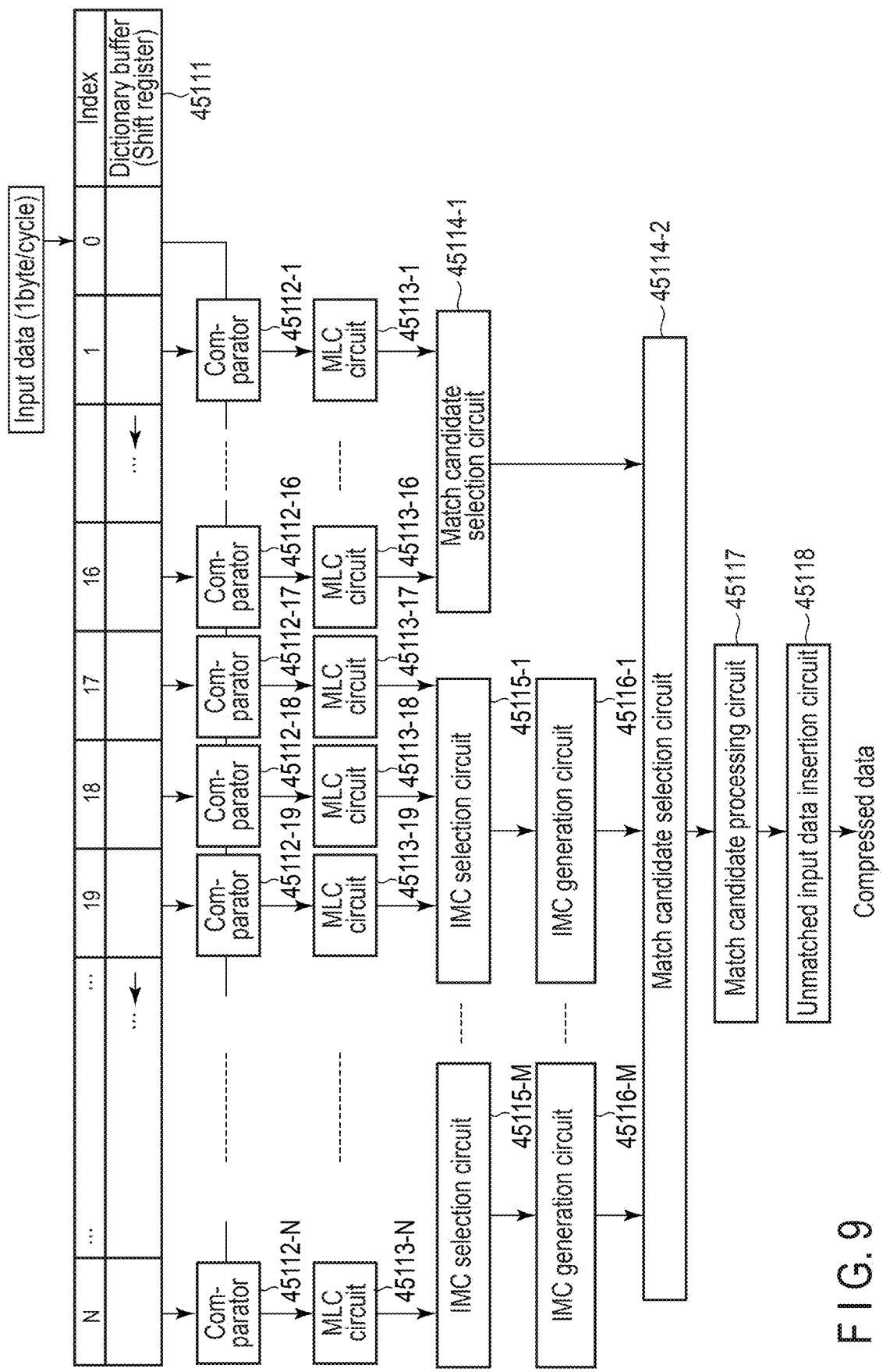
F I G. 9

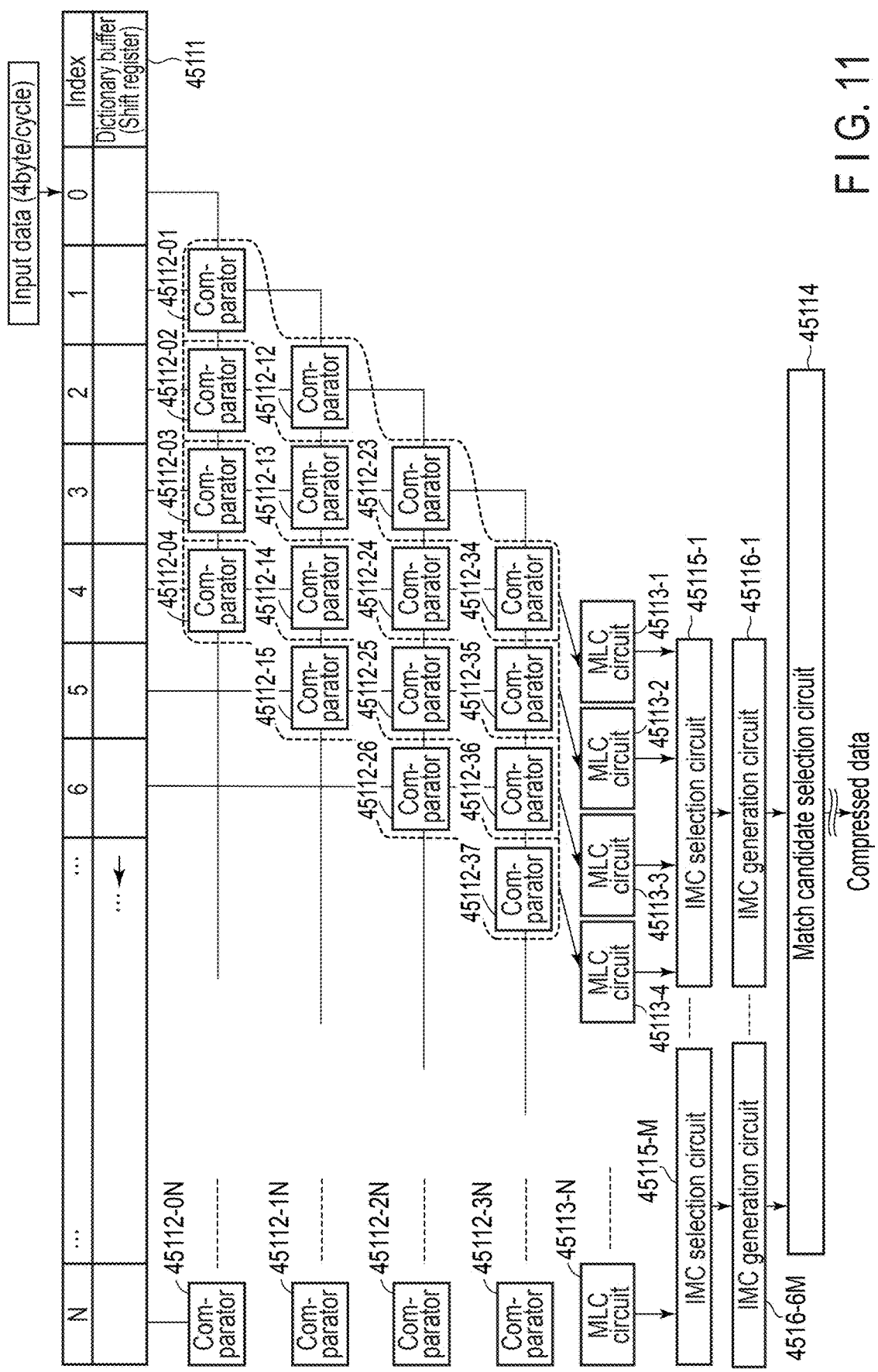
F I G. 11

| Input | | | | Output | | |
|---|---|---|---|---|---|---|
| Y3 | Y2 | Y1 | Y0 | Ypos | Len | LenNext |
| 0 | 0 | 0 | 0 | 0 | 0 | 0 |
| 0 | 0 | 0 | 1 | 0 | 1 | 1 |
| 0 | 0 | 1 | 0 | 0 | 0 | 0 |
| 0 | 0 | 1 | 1 | 0 | 2 | 2 |
| 0 | 1 | 0 | 0 | 0 | 0 | 0 |
| 0 | 1 | 0 | 1 | 0 | 1 | 1 |
| 0 | 1 | 1 | 0 | 0 | 0 | 0 |
| 0 | 1 | 1 | 1 | 0 | 3 | 3 |
| 1 | 0 | 0 | 0 | 3 | 1+LenPre | 0 |
| 1 | 0 | 0 | 1 | 3 | 1+LenPre | 1 |
| 1 | 0 | 1 | 0 | 3 | 1+LenPre | 0 |
| 1 | 0 | 1 | 1 | 3 | 1+LenPre | 2 |
| 1 | 1 | 0 | 0 | 2 | 2+LenPre | 0 |
| 1 | 1 | 0 | 1 | 2 | 2+LenPre | 1 |
| 1 | 1 | 1 | 0 | 1 | 3+LenPre | 0 |
| 1 | 1 | 1 | 1 | 0 | 4+LenPre | 4+LenPre |

DATA COMPRESSION CIRCUIT, MEMORY SYSTEM AND METHOD FOR CONTROLLING THE DATA COMPRESSION CIRCUIT

CROSS-REFERENCE TO RELATED APPLICATIONS

This application is based upon and claims the benefit of priority from Japanese Patent Application No. 2024-036933, filed Mar. 11, 2024, the entire contents of which are incorporated herein by reference.

FIELD

Embodiments described herein relate generally to a data compression circuit, a memory system and a method for controlling the data compression circuit.

BACKGROUND

In recent years, a memory system including a nonvolatile memory has been widely used. In such a memory system, storing a large amount of data as it is requires a memory system having a large storage capacity. For example, in a data center, using such a memory system requires a huge cost.

Therefore, in general, the size of data written to the memory system is reduced by performing lossless compression on the data.

A data compression circuit that executes lossless compression of this data has a high throughput if it can compress a large amount of data per unit time.

BRIEF DESCRIPTION OF THE DRAWINGS

FIG. 2 is a diagram illustrating data compression processing and data decompression processing executed by the data compression circuit and the data decompression circuit according to the first embodiment.

FIG. 4 is a diagram illustrating data compression processing executed by a data compression circuit according to a comparative example.

FIG. 5 is a diagram illustrating a configuration example of a match length calculation circuit included in a data compression circuit according to the comparative example.

FIG. 7 is a diagram illustrating a configuration example of an intermediate match candidate generation circuit included in the data compression circuit according to the first embodiment.

FIG. 9 is a diagram illustrating data compression processing executed by a data compression circuit according to a second embodiment.

FIG. 11 is a diagram illustrating data compression processing executed by a data compression circuit according to a third embodiment.

FIG. 13 is a diagram illustrating output data with respect to input data in a match length calculation circuit included in a data compression circuit according to the third embodiment.

DETAILED DESCRIPTION

Figure 1:
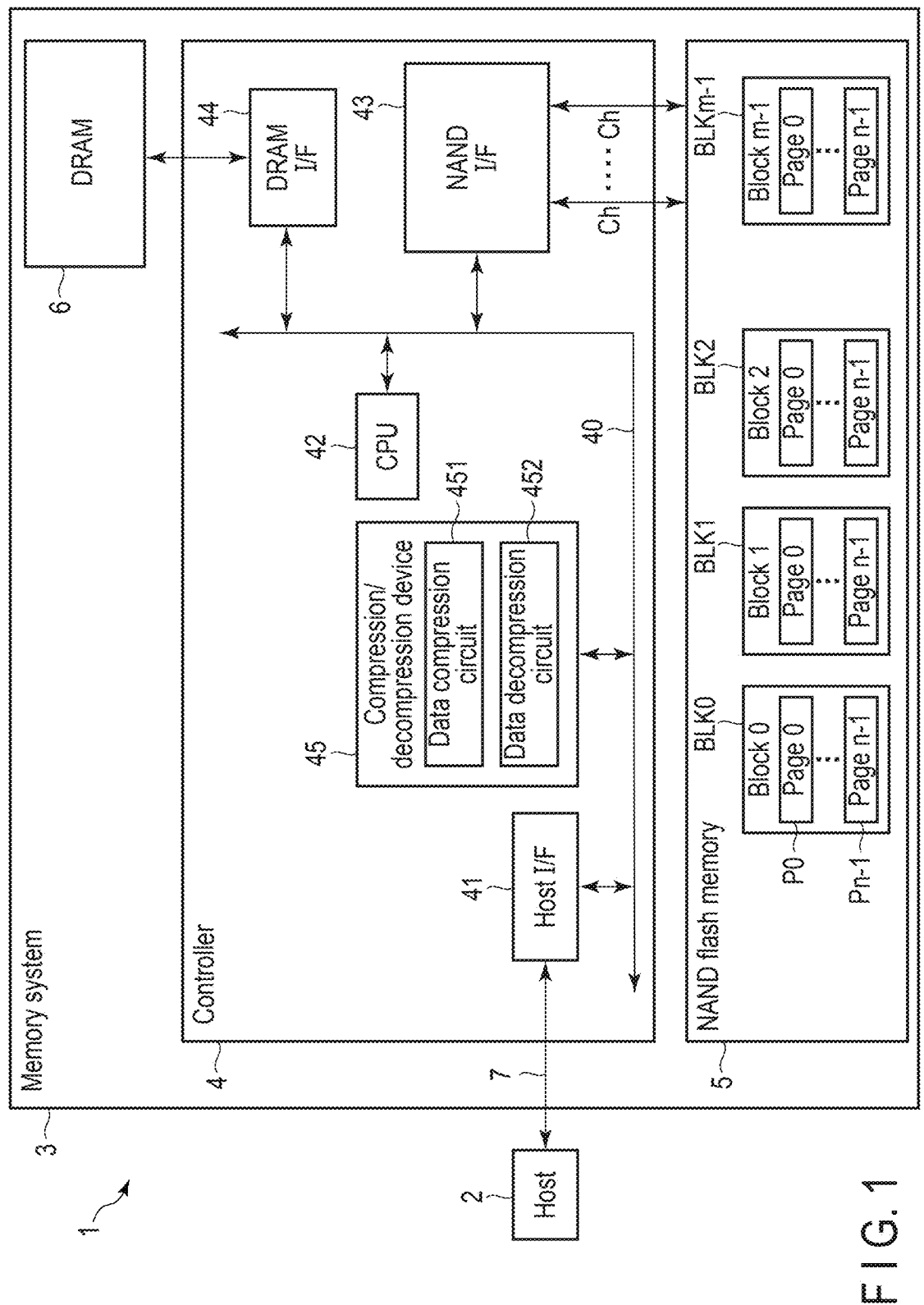
FIG. 1 is a block diagram illustrating a configuration example of a memory system including a data compression circuit according to a first embodiment.

Various embodiments will be described hereinafter with reference to the accompanying drawings.

In general, according to one embodiment, a data compression circuit is configured to compress first data which is input data. The data compression circuit comprises a buffer, a plurality of comparators, a plurality of match length calculation circuits, a plurality of intermediate match candidate selection circuits, and a plurality of intermediate match candidate generation circuits. The buffer includes a plurality of registers each storing a 1-byte data unit. One or more first registers in which data units included in the first data are sequentially stored for each cycle are included in the plurality of registers. Each of the plurality of comparators corresponds to a distance between the one or more first registers and a register that stores a data unit of an earlier storage order than the data unit stored in the first register. Each of the plurality of comparators compares a data unit stored in the one or more first registers and a data unit in the earlier storage order. Each of the plurality of match length calculation circuits corresponds to one or more comparators among the plurality of comparators. Each of the plurality of match length calculation circuits calculates a match length based on a result received from the corresponding one or more comparators. Each of the plurality of intermediate match candidate selection circuits corresponds to two or more match length calculation circuits among the plurality of match length calculation circuits. Each of the plurality of intermediate match candidate selection circuits selects a match length from two or more match lengths received from the two or more corresponding match length calculation circuits. Each of the plurality of intermediate match candidate generation circuits corresponds to an intermediate match candidate selection circuit among the plurality of intermediate match candidate selection circuits. Each of the plurality of intermediate match candidate generation circuits generates an intermediate match candidate based on the match length selected by the corresponding intermediate match candidate selection circuit. Each of the intermediate match candidate generation circuits is configured to calculate a match length with a bit width larger than a bit width of the match length calculation circuits. Each of the plurality of intermediate match candidate generation circuits generates an intermediate match candidate by incrementing, based on a match length received from the corresponding intermediate match candidate selection circuit, a match length corresponding to an intermediate match candidate generated in a previous cycle when a distance corresponding to the received match length matches a distance corresponding to the intermediate match candidate generated in the previous cycle and the received match length is greater than a threshold value. Each of the plurality of intermediate match candidate generation circuits generates the received match length as a new intermediate match candidate when the distance corresponding to the received match length does not match the distance corresponding to the intermediate match candidate generated in the previous cycle, or when the received match length is equal to or less than the threshold value.

First Embodiment

FIG. 1 is a block diagram illustrating a configuration example of an information processing system 1 including a memory system 3 including a data compression circuit 451 according to a first embodiment. The memory system 3 according to the first embodiment is a storage device including a nonvolatile memory.

The information processing system 1 includes a host device (host) 2 and the memory system 3. The host 2 and the memory system 3 can be connected via a bus 7.

The host 2 is an information processing apparatus. The host 2 is, for example, a personal computer, a server computer, or a mobile terminal. The host 2 accesses the memory system 3. Specifically, the host 2 transmits a write command, which is a command for requesting writing of data into the nonvolatile memory, to the memory system 3. The host 2 transmits a read command, which is a command for requesting reading of data from the nonvolatile memory, to the memory system 3.

The memory system 3 is a semiconductor storage device configured to write data in a nonvolatile memory and read data from the nonvolatile memory. The memory system 3 is communicably connected to the host 2. The memory system 3 is implemented by, for example, a solid state device (SSD). The nonvolatile memory is, for example, a NAND flash memory 5.

The memory system 3 can be used as a storage of the host 2. The memory system 3 may be built in the host 2 or may be connected to the host 2 via a cable or a network.

Communication between the memory system 3 and the host 2 is executed via the bus 7. The bus 7 is mainly used for transmission of data and an input/output command (I/O command) from the host 2 to the memory system 3 and transmission of data and a response from the memory system 3 to the host 2. The I/O command is a command for writing or reading data to or from the nonvolatile memory. Examples of the I/O command include a write command for requesting writing of data into the nonvolatile memory and a read command for requesting reading of data from the nonvolatile memory.

An interface for connecting the memory system 3 and the host 2 conforms to standards such as SCSI, Serial Attached SCSI (SAS), ATA (AT Attachment), Serial ATA (SATA), PCI Express™ (PCIe™), Ethernet™, Fibre channel, and NVM Express™ (NVMe™).

Next, an internal configuration of the memory system 3 will be described. The memory system 3 includes a memory controller (controller) 4 and the NAND flash memory 5. The memory system 3 may further include a dynamic random access memory (DRAM) 6.

The controller 4 is a memory controller that controls the NAND flash memory 5 and the DRAM 6. The controller 4 is, for example, a control circuit such as a system-on-a-chip (SoC). The controller 4 is electrically connected to each of the NAND flash memory 5 and the DRAM 6. The controller 4 processes various commands received from the host 2. The controller 4 executes writing of data to the NAND flash memory 5 by processing the write command. The controller 4 executes reading of data from the NAND flash memory 5 by processing the read command. The controller 4 may contain a static random access memory (SRAM) or a DRAM. In this case, the DRAM 6 outside the controller 4 may not be provided.

The controller 4 functions as, for example, a flash translation layer (FTL) configured to execute data management and block management of the NAND flash memory 5. The data management executed by the FTL includes management of mapping information indicating a correspondence relationship between each logical address and each physical address of the NAND flash memory 5. Block management includes defective block management, wear leveling, and garbage collection.

The logical address is used by the host 2 to address a storage area of the memory system 3. The logical address is, for example, a logical block address (LBA).

Management of mapping between each logical address and each physical address is executed using, for example, a logical-to-physical address conversion table. Using the logical-to-physical address translation table, the controller 4 manages mapping between each logical address and each physical address in a specific management size unit. The physical address corresponding to a certain logical address indicates a physical storage location in the NAND flash memory 5 to which the user data of the logical address is written. The logical-to-physical address conversion table may be loaded from the NAND flash memory 5 to the DRAM 6 at the time of activation of the memory system 3.

Data can be written to one page only once per P/E cycle. Therefore, the controller 4 writes the update user data corresponding to a certain logical address not to the physical storage location where the previous user data corresponding to this logical address is stored but to another physical storage location. Then, the controller 4 invalidates the previous user data by updating the logical-to-physical address conversion table so as to associate the logical address with another physical storage location.

Further, the controller 4 is communicably connected to the DRAM 6. The controller 4 executes writing of data to the DRAM 6 and reading of data from the DRAM 6.

The NAND flash memory 5 is a nonvolatile memory. The NAND flash memory 5 is, for example, a flash memory having a three-dimensional structure. The NAND flash memory 5 includes a plurality of memory cells arranged in a matrix. The NAND flash memory 5 includes a plurality of blocks BLK0 to BLKm−1. Each of the blocks BLK0 to BLKm−1 is a unit of a data erasing operation for erasing data. The data erasing operation is also referred to as an erase operation or simply an erasing operation. Each of the blocks BLK0 to BLKm−1 is also referred to as a physical block, a flash block, or a memory block.

Each of the blocks BLK0 to BLKm−1 includes a plurality of pages (here, pages P0 to Pn−1). Each page includes a plurality of memory cells connected to the same word line. Each of the pages P0 to Pn−1 is a unit of a data write operation and a data read operation.

The DRAM 6 is a volatile memory. A part of the storage area of the DRAM 6 is used, for example, to temporarily store information used to manage the memory system 3. In addition, another part of the storage area of the DRAM 6 can be used to temporarily store write data received from the host 2 or read data read from the NAND flash memory 5.

Next, an example of an internal configuration of the controller 4 will be described. The controller 4 includes a host interface (host I/F) 41, a CPU 42, a NAND interface (NAND I/F) 43, a DRAM interface (DRAM I/F) 44, and a compression/decompression device 45. These units are connected via an internal bus 40.

The host interface 41 is an interface circuit that executes communication with the host 2. The host interface 41 receives, for example, an I/O command and data from the host 2. In addition, the host interface 41 transmits data and a response to the host 2.

The CPU 42 is a processor. The CPU 42 controls the host interface 41, the NAND interface 43, the DRAM interface 44, and the compression/decompression device 45. The CPU 42 loads a control program (firmware) stored in the NAND flash memory 5 or a ROM (not illustrated) into the DRAM 6 or a RAM (not illustrated) in the controller 4. The CPU 42 performs various processes by executing this control program (firmware).

The NAND interface 43 is an interface circuit that executes access to the NAND flash memory 5.

The NAND interface 43 is an interface circuit that executes access to the NAND flash memory 5. When the NAND flash memory 5 includes a plurality of NAND flash dies, the NAND interface 43 may be connected to each of the plurality of NAND flash memory dies via a plurality of channels. By driving the plurality of NAND flash dies in parallel, access to the entire NAND flash memory 5 can be widened in bandwidth.

The DRAM interface 44 is an interface circuit that executes access to the DRAM 6. The DRAM interface 44 stores data in the DRAM 6 and reads data stored in the DRAM 6.

The compression/decompression device 45 is a device that compresses data and decompresses data. The compression/decompression device 45 includes a data compression circuit 451 and a data decompression circuit 452.

The data compression circuit 451 is a circuit that compresses data to be written to the NAND flash memory 5. The data compression circuit 451 compresses, for example, write data associated with a write command received from the host 2. The data compression circuit 451 compresses the write data using a lossless compression algorithm. Hereinafter, data obtained by compressing write data is referred to as compressed data. Examples of the lossless compression algorithm include dictionary-based encoding, entropy encoding, and a combination of dictionary-based encoding and entropy encoding (referred to as deflate). Hereinafter, it is assumed that at least dictionary-based encoding is used as the lossless compression algorithm.

The compressed data has a smaller size than the write data before compression. The larger the size of the write data compressed at a time by the data compression circuit 451, the smaller the ratio of the size of the compressed data to the size of the write data. That is, the data compression circuit 451 can compress the write data with higher efficiency as the write data having a larger size is compressed at a time. This is because the larger the size of the write data compressed at a time, the larger the amount of information that can be referred to in the compression processing of the write data.

The data decompression circuit 452 is a circuit that generates uncompressed data by decompressing compressed data. The data decompression circuit 452 decompresses the compressed data read from the NAND flash memory 5 based on, for example, a read command received from the host 2.

Next, the data compression processing and the data decompression processing will be described. FIG. 2 is a diagram illustrating data compression processing and data decompression processing executed by the data compression circuit 451 and the data decompression circuit 452 according to the first embodiment.

Here, it is assumed that the data compression circuit 451 is configured to perform dictionary-based encoding and entropy encoding. In this case, the data compression circuit 451 includes a dictionary-based encoding unit 4511 and an entropy encoding unit 4512.

The dictionary-based encoding unit 4511 performs dictionary-based encoding on input data (uncompressed data).

The dictionary-based encoding is an encoding method for converting data to be compressed into a distance and a match length using a dictionary buffer that holds data input in the past. The dictionary-based encoding is also referred to as dictionary-based compression. Note that, as the dictionary-based encoding, for example, LZ77, LZSS, or the like can be used.

In a case where data matching the compression target data exists in the dictionary buffer, the dictionary-based encoding unit 4511 searches the dictionary buffer to acquire past data at least partially matching the compression target data, and obtains the distance and the match length. Then, the dictionary-based encoding unit replaces the compression target data with the distance and the match length, and outputs the result as a result of the dictionary-based encoding. The distance is a distance from a position where the compression target data is stored to a position where the acquired past data is stored in the dictionary buffer. The match length is a length of a matched portion between the acquired past data and the compression target data. As a result, the dictionary-based encoding unit 4511 can compress the data by converting the compression target data into the distance and the match length.

On the other hand, when there is no data that matches the compression target data in the dictionary buffer, the dictionary-based encoding unit 4511 outputs the compression target data as it is as a result of the dictionary-based encoding.

The entropy encoding unit 4512 performs entropy encoding on the input data.

In entropy encoding, a code length of input data is converted according to an appearance frequency of the data. That is, the entropy encoding unit 4512 can reduce the code amount as a whole by allocating codes having different code lengths to the input data using the difference in the appearance frequency of the input data.

For example, the entropy encoding unit 4512 uses Huffman encoding as entropy encoding. In the case that the Huffman encoding is used, the entropy encoding unit 4512 may perform the static Huffman encoding in which the encoding is performed using the previously-structured code tree, or may perform the dynamic Huffman encoding in which the code tree is changed according to the data to be subjected to the Huffman encoding. Furthermore, as another entropy encoding, for example, arithmetic encoding or the like may be used.

According to such a data compression circuit 451, in the data compression processing, first, the dictionary-based encoding unit 4511 executes the dictionary-based encoding on the input uncompressed data. Then, the entropy encoding unit 4512 performs entropy encoding on the result of the dictionary-based encoding. As a result, the data compression circuit 451 generates compressed data. The generated compressed data is written to, for example, the NAND flash memory 5.

The data decompression circuit 452 includes an entropy decoding unit 4521 and a dictionary-based decoding unit 4522.

The entropy decoding unit 4521 performs entropy decoding on the input data (compressed data). The entropy decoding unit 4521 sends the result of the entropy decoding to the dictionary-based decoding unit 4522.

The dictionary-based decoding unit 4522 performs dictionary-based decoding on the input data. As a result, the dictionary-based decoding unit 4522 outputs the uncompressed data.

According to such a data decompression circuit 452, in the data decompression processing, first, the entropy decoding unit 4521 executes entropy decoding on the compressed data read from the NAND flash memory 5. Then, the dictionary-based decoding unit 4522 performs dictionary-based decoding on the entropy decoding result. As a result, the data decompression circuit 452 generates uncompressed data.

Figure 3:
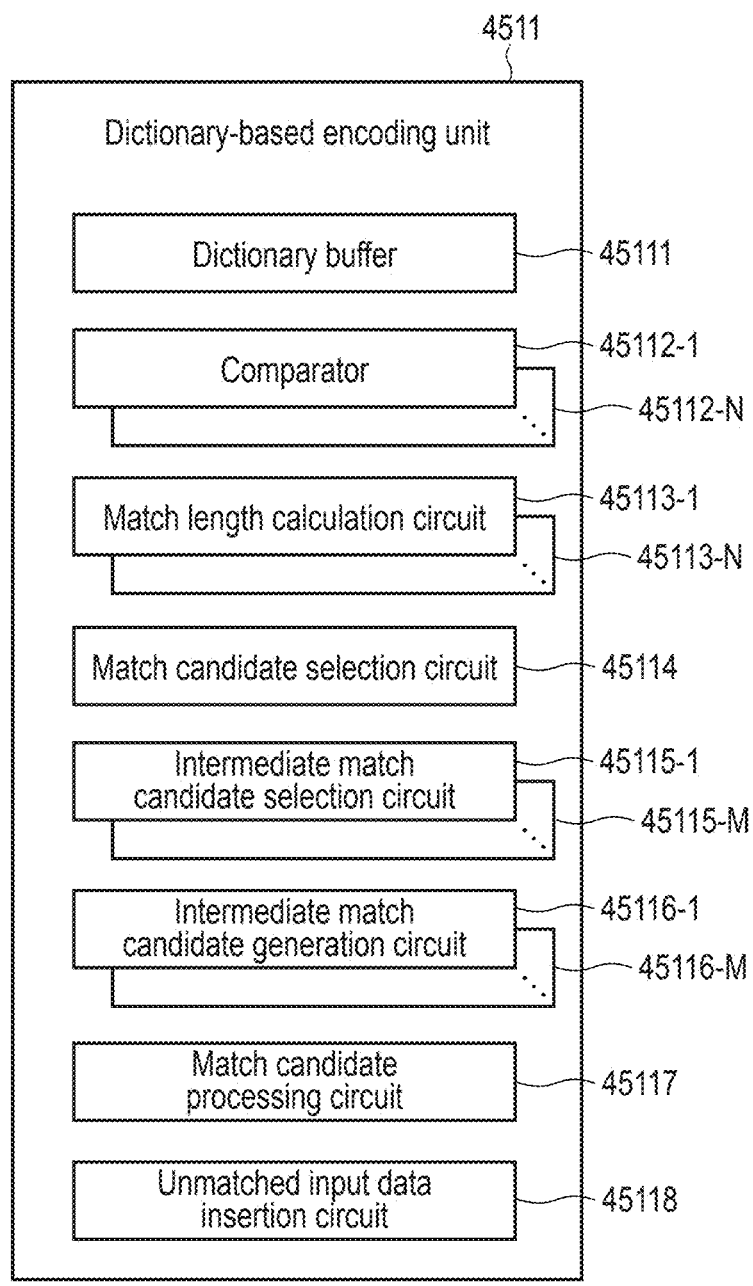
FIG. 3 is a block diagram illustrating a configuration example of a dictionary-based encoding unit of the data compression circuit according to the first embodiment.

Next, a detailed configuration example of the dictionary-based encoding unit 4511 will be described. FIG. 3 is a block diagram illustrating a configuration example of the dictionary-based encoding unit 4511 of the data compression circuit 451 according to the first embodiment.

The dictionary-based encoding unit 4511 includes a dictionary buffer 45111, a plurality of comparators 45112-1 to 45112-N, a plurality of match length calculation circuits 45113-1 to 45113-N, a match candidate selection circuit 45114, an intermediate match candidate selection circuit 45115-1 to 45115-M, an intermediate match candidate generation circuit 45116-1 to 45116-M, a match candidate processing circuit 45117, and an unmatched input data insertion circuit 45118.

The dictionary buffer 45111, the comparator 45112, the match length calculation circuit 45113, the match candidate selection circuit 45114, the intermediate match candidate selection circuit 45115, the intermediate match candidate generation circuit 45116, the match candidate processing circuit 45117, and the unmatched input data insertion circuit 45118 are implemented by at least one of a register, an adder, a comparator, a selector, and other arithmetic units. The register is implemented by, for example, a sequential circuit such as a flip-flop. The adder, the comparator, the selector, and the other arithmetic units are implemented by, for example, a combinational logic circuit.

The dictionary buffer 45111 is a shift register (which may also be referred to as a sliding buffer) that stores input data. The dictionary buffer 45111 has, for example, N+1 entries. Each entry is, for example, a register that stores one data unit. The data unit is also referred to as a symbol. The size of the data unit is, for example, 1 byte. N is an integer of 1 or more, for example, 2048. Each entry is associated with an index indicating a value from 0 to N. Among the plurality of entries, for example, the entry corresponding to 0 is a register in which the latest data unit of the input data is sequentially stored.

In the first embodiment, it is assumed that a 1-byte data unit is stored in the dictionary buffer 45111 every cycle. In this case, the data unit stored in each entry is shifted every cycle to an entry corresponding to an index larger by one. That is, the data unit stored in the entry corresponding to 0 is stored in the entry corresponding to 1 in the next cycle. Then, the latest data unit is newly stored in the entry corresponding to 0. Thus, an entry corresponding to a larger index stores an older data unit. Here, "old" corresponds to that the order stored in the dictionary buffer 45111 is the front.

In addition, the distance in the dictionary buffer 45111 is represented by a difference between indexes corresponding to the respective entries. For example, a distance between an entry corresponding to 0 and an entry corresponding to N is N.

The comparator 45112 is a circuit that compares two data units for each cycle. Each of the plurality of comparators 45112-1 to 45112-N corresponds to each of the entries corresponding to 1 to N in the dictionary buffer 45111. That is, each of the plurality of comparators 45112-1 to 45112-N corresponds to each distance between the register in the dictionary buffer 45111 in which a new data unit is stored and the register in which the data unit is stored in an earlier storage order than the data unit stored in this register. Each of the plurality of comparators 45112-1 to 45112-N compares the data unit stored in the corresponding entry and the data unit stored in the entry corresponding to 0. That is, the result of the comparator 45112-N indicates whether or not the data unit having the distance N is matched with the latest data. Here, the result of each of the plurality of comparators 45112-1 to 45112-N is an output signal of each of the comparators 45112-1 to 45112-N, which indicates a result of the comparison. Each of the plurality of comparators 45112-1 to 45112-N transmits the result to the corresponding match length calculation circuit 45113.

The match length calculation circuit 45113 is a circuit that calculates a match length at a corresponding distance for each cycle. Each of the match length calculation circuits 45113-1 to 45113-N corresponds to a distance from 1 to N. Each of the match length calculation circuits 45113-1 to 45113-N receives a result from the comparators 45112 corresponding to the same distance. Each of the match length calculation circuits 45113-1 to 45113-N calculates a match length based on the received result. When the received result indicates that the two data units match, the match length calculation circuit 45113 increments the match length by 1. When the received result indicates that the two data units do not match, the match length calculation circuit 45113 resets the match length to 0. Then, the match length calculation circuit 45113 transmits the corresponding distance and the match length to the corresponding intermediate match candidate selection circuit 45115.

The match candidate selection circuit 45114 is a circuit that selects a match candidate from a plurality of intermediate match candidates and a plurality of match lengths. For example, the match candidate selection circuit 45114 selects, as a match candidate, an intermediate match candidate having the longest match length among the intermediate match candidates output by each of the intermediate match candidate generation circuits 45116-1 to 45116-M described later. In a case where there is a plurality of longest match lengths among the plurality of match lengths, the match candidate selection circuit 45114 selects, for example, a match length having the shortest distance to the latest data unit as a match candidate. Then, the match candidate selection circuit 45114 transmits the selected match candidate to the match candidate processing circuit 45117.

The intermediate match candidate selection circuit 45115-1 to 45115-M is a circuit that selects one match length from a plurality of match lengths. Each of the intermediate match candidate selection circuits 45115-1 to 45115-M corresponds to two or more match length calculation circuits among the plurality of match length calculation circuits 45113-1 to 45113-N. Each of the intermediate match candidate selection circuits 45115-1 to 45115-M selects the longest match length from a group including a plurality of match lengths received from the corresponding match length calculation circuits 45113, for example.

In a case where there is a plurality of longest match lengths among the plurality of match lengths, the intermediate match candidate selection circuit 45115 selects, for example, a match length having the shortest distance to the latest data unit as a match candidate. Then, each of the intermediate match candidate selection circuits 45115-1 to 45115-M transmits the selected intermediate match candidate to the corresponding intermediate match candidate generation circuit 45116-1 to 45116-M.

The intermediate match candidate generation circuit 45116-1 to 45116-M is a circuit that calculates a match length of an intermediate match candidate at a corresponding distance for each cycle. Each of the intermediate match candidate generation circuits 45116-1 to 45116-M corresponds to each of the intermediate match candidate selection circuits 45115-1 to 45115-M. Each of the intermediate match candidate generation circuits 45116-1 to 45116-M receives the match length from the corresponding intermediate match candidate selection circuit 45115. Each of the intermediate match candidate generation circuits 45116-1 to 45116-M generates an intermediate match candidate by incrementing a match length corresponding to an intermediate match candidate generated in one previous cycle by 1 when the distance corresponding to the received match length matches the distance corresponding to the match length received in a previous cycle and the received match length exceeds a threshold value. In addition, each of the intermediate match candidate generation circuits 45116-1 to 45116-M generates an intermediate match candidate by associating the received match length with a new intermediate match candidate when the distance corresponding to the received match length does not match the distance corresponding to the match length received in the previous cycle or when the received match length is equal to or less than the threshold value. The threshold value is, for example, 0. Then, the intermediate match candidate generation circuit 45116-1 to 45116-M transmits the corresponding distance and the match length to the match candidate selection circuit 45114.

The match candidate processing circuit 45117 is a circuit that executes processing on input data based on the match candidate selected by the match candidate selection circuit 45114. For example, the match candidate processing circuit 45117 stores the match candidate selected by the match candidate selection circuit 45114 for each cycle. Then, the match candidate processing circuit 45117 compares the match candidate selected in the latest cycle with the match candidate selected in the previous cycle for each cycle. The match candidate processing circuit 45117 determines whether or not to adopt the match candidate selected and stored in the previous cycle based on the comparison result. For example, the match candidate processing circuit 45117 uses a method of storing the latest match candidate by discarding the match candidate of the previous cycle when there is a mismatch such that the latest match candidate is obtained by extending the match length of the match candidate of the previous cycle. Alternatively, the match candidate processing circuit 45117 may use a method of concatenating match candidates when a specific condition is satisfied, or may use various other methods to process the input data. As a result, it is possible to avoid occurrence of data duplication due to a plurality of match candidates.

The unmatched input data insertion circuit 45118 is a circuit that inserts the unmatched data into the input data processed by the match candidate processing circuit 45117. As a result, compressed data is generated. Furthermore, the generated compressed data can be further input to the entropy encoding unit 4512.

Hereinafter, for simplicity, data output by the dictionary-based encoding executed by the dictionary-based encoding unit 4511 is referred to as compressed data, and the dictionary-based encoding is referred to as data compression processing.

First, a comparative example in which the dictionary-based encoding unit executes the data compression processing without using the intermediate match candidate will be described. FIG. 4 is a diagram illustrating data compression processing executed by a data compression circuit according to a comparative example.

In the entry corresponding to the index indicating 0 in the dictionary buffer 45111A, the latest data unit is input for each cycle. In addition, the data unit stored in each entry of the dictionary buffer 45111A is shifted to a subsequent entry for each cycle.

Each of the comparators 45112A-1 to 45112A-N compares the data unit stored in the entry corresponding to 0 and the data unit stored in each of the entries corresponding to 1 to N. Specifically, the comparator 45112A-1 compares the data unit stored in the entry corresponding to 0 and the data unit corresponding to the entry corresponding to 1 (that is, the data unit having the distance of 1). The comparator 45112A-2 compares the data unit stored in the entry corresponding to 0 and the data unit corresponding to the entry corresponding to 2 (that is, the data unit having the distance of 2). The comparator 45112A-3 compares the data unit stored in the entry corresponding to 0 and the data unit corresponding to the entry corresponding to 3 (that is, the data unit having the distance of 3). The comparator 45112A-N compares the data unit stored in the entry corresponding to 0 and the data unit corresponding to the entry corresponding to N (that is, the data unit having the distance of N).

Each of the match length calculation circuits 45113A-1 to 45113A-N calculates a match length based on the result output by the corresponding comparator 45112A-1 to 45112A-N. Each of the match length calculation circuits 45113A-1 to 45113A-N in the comparative example calculates the match length using an 8-bit register.

A configuration example of the match length calculation circuit 45113A will be described with reference to FIG. 5. FIG. 5 is a diagram illustrating a configuration example of a match length calculation circuit included in a data compression circuit according to the comparative example. FIG. 5 illustrates the match length calculation circuit 45113A-1. Each of the match length calculation circuits 45113A-2 to 45113A-N has the same configuration as the match length calculation circuit 45113A-1.

The match length calculation circuit 45113A-1 includes a selector 451131A and a register 451132A.

The selector 451131A selects update of the match length based on the result of the comparator.

The register 451132A is an 8-bit register that temporarily stores the latest match length.

The match length calculation circuit 45113A-1 receives a result from the comparator 45112A-1 for each cycle. The result indicates matched or unmatched between the two data units.

When the result indicates unmatched, the selector 451131A selects 0 and stores the selected value in the register 451132A. As a result, the match length is updated to 0.

In a case where the result indicates matched, the selector 451131A selects a match length to which saturation addition has been performed. This match length is a value obtained by adding 1 to the match length previously stored in the register 451132A. When the match length stored in register 451132A is the upper limit value (for example, 255), the upper limit value is maintained. Then, the saturation-added match length is stored in the register 451132A.

Then, the match length calculation circuit 45113A-1 outputs the match length stored in the register 451132A for each cycle.

The description refers back to FIG. 4.

The match candidate selection circuit 45114A selects a match candidate from the match lengths output from the respective match length calculation circuits 45113A-1 to 45113A-N. For example, the match candidate selection circuit 45114A selects the longest match length among a plurality of match lengths as a match candidate. In a case where there are two or more longest match lengths, the match candidate selection circuit 45114A selects a match length having the shortest distance as a match candidate.

The match candidate processing circuit 45117A and the unmatched input data insertion circuit 45118A generate compressed data based on the match candidate selected by the match candidate selection circuit 45114A.

As described above, in the comparative example, each of the N match length calculation circuits 45113A executes the match length calculation with a bit width of 8 bits. Therefore, in order to achieve a high throughput, the circuit area increases as the value of N increases.

On the other hand, for example, the N match length calculation circuits 45113 in the first embodiment execute the match length calculation with a bit width of 4 bits, which is half of that in the comparative example. Then, the data compression processing is executed using the intermediate match candidate selected from the match lengths calculated with the bit width of 4 bits.

Figure 6:
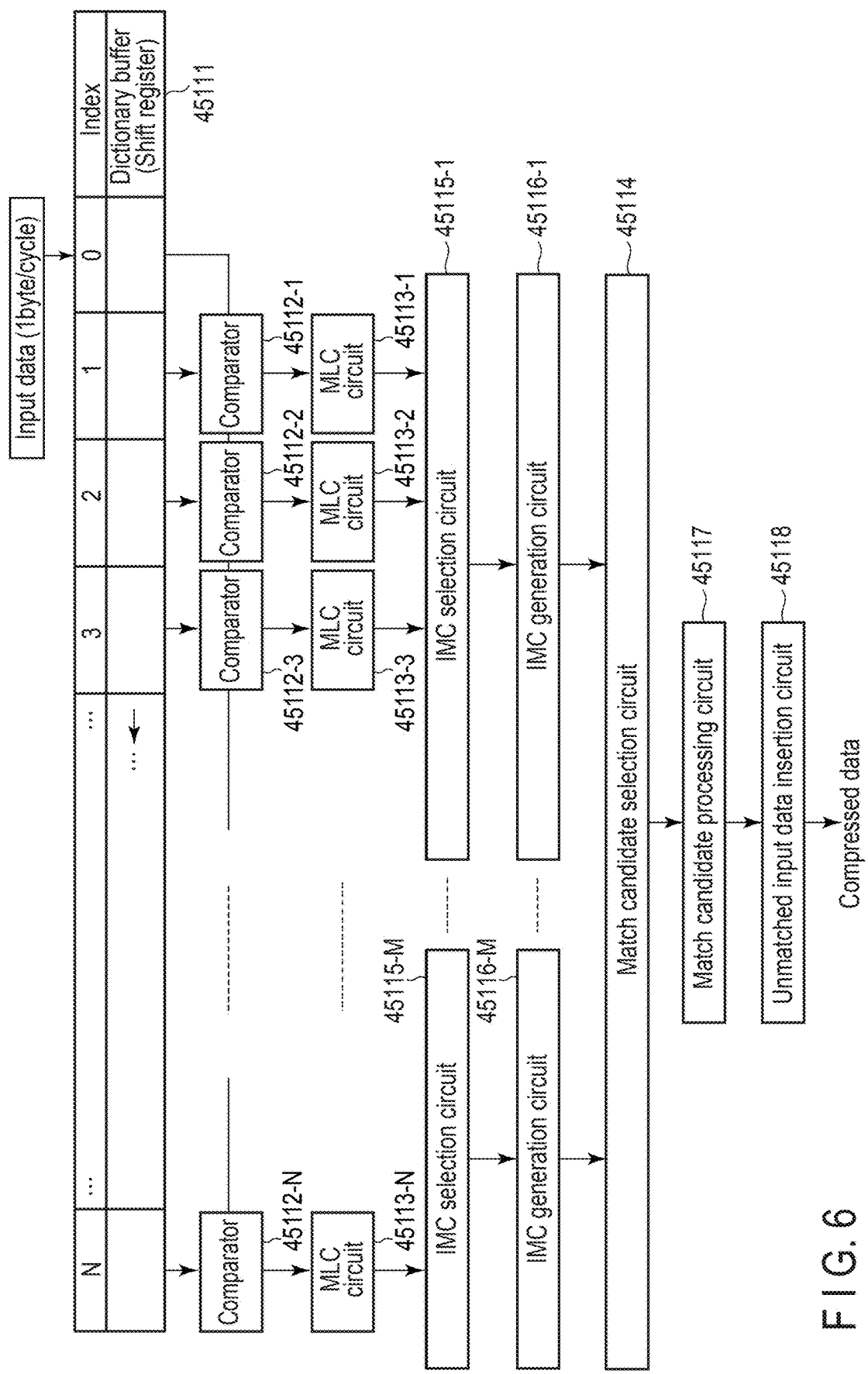
FIG. 6 is a diagram illustrating data compression processing executed by a data compression circuit according to the first embodiment.

FIG. 6 is a diagram illustrating data compression processing executed by a data compression circuit according to the first embodiment.

In the entry corresponding to the index indicating 0 in the dictionary buffer 45111, the latest data unit is input for each cycle. In addition, the data unit stored in each entry of the dictionary buffer 45111 is shifted to a subsequent entry for each cycle.

Each of the comparators 45112-1 to 45112-N compares the data unit stored in the entry corresponding to 0 and the data unit stored in each of the entries corresponding to 1 to N. Specifically, the comparator 45112-1 compares the data unit stored in the entry corresponding to 0 and the data unit corresponding to the entry corresponding to 1 (that is, the data unit having the distance of 1). The comparator 45112-2 compares the data unit stored in the entry corresponding to 0 and the data unit corresponding to the entry corresponding to 2 (that is, the data unit having the distance of 2). The comparator 45112-3 compares the data unit stored in the entry corresponding to 0 and the data unit corresponding to the entry corresponding to 3 (that is, the data unit having the distance of 3). The comparator 45112-N compares the data unit stored in the entry corresponding to 0 and the data unit corresponding to the entry corresponding to N (that is, the data unit having the distance of N).

Each of the match length calculation (MLC) circuits 45113-1 to 45113-N calculates a match length based on the result output by the corresponding comparator 45112-1 to 45112-N. Each of the match length calculation (MLC) circuits 45113-1 to 45113-N in the first embodiment calculates the match length using a 4-bit register.

Each of the match length calculation (MLC) circuits 45113 according to the first embodiment calculates the match length by a method similar to that of the match length calculation circuit 45113A according to the comparative example. However, the match length calculation (MLC) circuit 45113 according to the first embodiment uses a 4-bit register instead of an 8-bit register. The upper limit value of the match length calculated by the match length calculation (MLC) circuit 45113 is 15. Therefore, the match length calculation (MLC) circuit 45113 according to the first embodiment is implemented by a register having a half size as compared with the match length calculation circuit 45113A according to the comparative example.

Each of the match length calculation (MLC) circuits 45113-1 to 45113-N then transmits the match length stored in the register to the corresponding intermediate match candidate (IMC) selection circuit 45115 for each cycle. For example, when the maximum value N of the index is 2048 and the number M of the intermediate match candidate (IMC) selection circuits 45115 and the intermediate match candidate (IMC) generation circuits 45116 is 128, 16 match length calculation (MLC) circuits 45113 correspond to one intermediate match candidate (IMC) selection circuit 45115. Specifically, each of the match length calculation (MLC) circuits 45113-1 to 45113-16 transmits the match length to the intermediate match candidate (IMC) selection circuit 45115-1. Although not illustrated, each of the match length calculation (MLC) circuits 45113-17 to 45113-32 transmits the match length to the intermediate match candidate (IMC) selection circuit 45115-2. Further, each of the match length calculation (MLC) circuits 45113-2033 to 45113-N (2048) transmits the match length to the intermediate match candidate (IMC) selection circuit 45115-M (128).

Each of the intermediate match candidate (IMC) selection circuits 45115-1 to 45115-M selects one match candidate from the received match lengths. For example, each of the intermediate match candidate (IMC) selection circuits 45115-1 to 45115-M selects the longest match length among the plurality of received match lengths for each cycle. Then, each of the intermediate match candidate (IMC) selection circuits 45115-1 to 45115-M transmits the length of the selected match length and the distance corresponding to the match length to each of the intermediate match candidate (IMC) generation circuits 45116-1 to 45116-M.

Each of the intermediate match candidate (IMC) generation circuits 45116-1 to 45116-M generates an intermediate match candidate based on the received match length and the distance.

A configuration of the intermediate match candidate (IMC) generation circuit 45116 will be described with reference to FIG. 7. FIG. 7 is a diagram illustrating a configuration example of an intermediate match candidate generation circuit included in the data compression circuit according to the first embodiment. FIG. 7 illustrates the intermediate match candidate generation circuit 45116-1. Each of the intermediate match candidate generation circuits 45116-2 to 45116-N has the same configuration as the intermediate match candidate generation circuit 45116-1.

The intermediate match candidate generation circuit 45116-1 includes a register 451161, a selector 451162, and a register 451163.

The register 451161 is a register that temporarily stores the distance of the intermediate match candidate. The register 451161 temporarily stores, for example, 4-bit data.

The selector 451162 determines the update of the intermediate match candidate based on the result of the determination as to whether or not the distance of the latest intermediate match candidate and the distance of the intermediate match candidate of the previous cycle are the same and the length of the intermediate match candidate is greater than 0. 0 is, for example, a preset threshold value.

The register 451133 is a register that temporarily stores the length of the latest intermediate match candidate. The register 451133 temporarily stores, for example, 8-bit data.

The intermediate match candidate generation circuit 45116-1 receives the length (newLen) and the distance (newX) of the match candidate from the intermediate match candidate selection circuit 45115-1 for each cycle. The length newLen of the match candidate is 4-bit data. In addition, the distance newX is also 4-bit data.

The received latest distance newX is stored in the register 451161.

Based on the length newLen and the distance newX of the received latest intermediate match candidate and the distance X stored in the register 451161, the intermediate match candidate generation circuit 45116-1 determines whether or not the condition that newX and X are the same and newLen is greater than 0 is satisfied.

When the above condition is not satisfied, the selector 451162 selects the newLen and outputs the newLen to the register 451163. As a result, the match length becomes the same value as the newLen.

When the above condition is satisfied, the selector 451162 selects the saturation-added match length. This match length is a value obtained by adding 1 to the match length previously stored in the register 451163. When the match length stored in register 451163 is the upper limit value, the upper limit value is maintained. Then, the saturation-added match length is stored in the register 451163.

Then, the intermediate match candidate generation circuit 45116 outputs the match length (Length) stored in the register 451163 and the distance (X) stored in the register 451161 as intermediate match candidates for each cycle. As a result, the intermediate match candidate generation circuit 45116 can generate an intermediate match candidate including a match length of 8 bits based on the selected match length of 4 bits in width.

The description refers back to FIG. 6. The match candidate selection circuit 45114 selects one match candidate from a plurality of intermediate match candidates received from each of the intermediate match candidate (IMC) generation circuits 45116-1 to 45116-M. For example, the match candidate selection circuit 45114 selects, as a match candidate, an intermediate match candidate including a longest match length among a plurality of intermediate match candidates. When there are two or more longest match lengths, the match candidate selection circuit 45114 selects an intermediate match candidate including the longest match length and corresponding to the shortest distance as a match candidate.

The match candidate processing circuit 45117 and the unmatched input data insertion circuit 45118 generate compressed data based on the match candidate selected by the match candidate selection circuit 45114.

Figure 8:
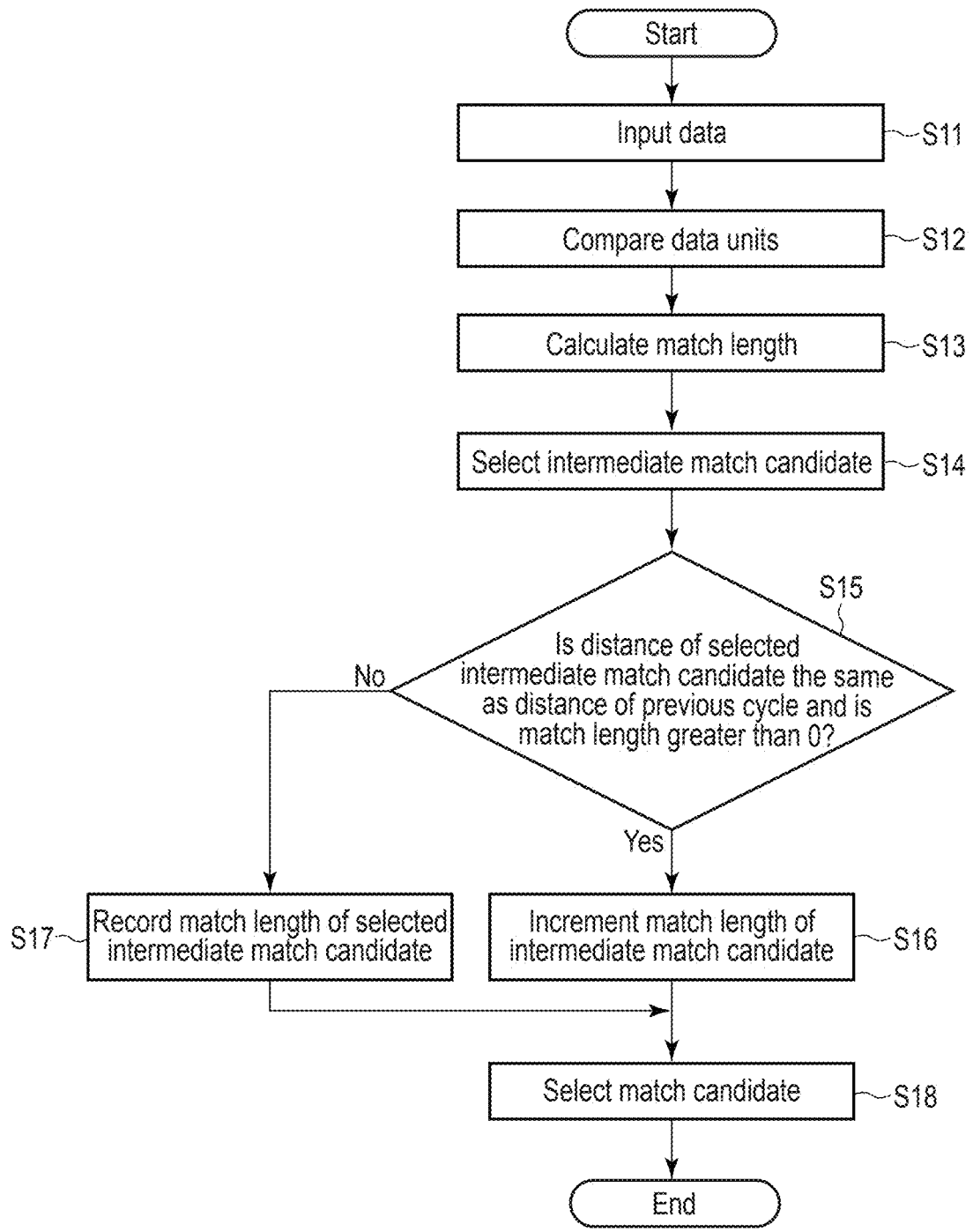
FIG. 8 is a flowchart illustrating a procedure of data compression processing executed by the data compression circuit according to the first embodiment.

Next, a procedure of processing executed in each cycle in the data compression processing in the first embodiment will be described. FIG. 8 is a flowchart illustrating a procedure of data compression processing executed by the data compression circuit according to the first embodiment. With the start of the cycle, the data compression processing is started.

First, one data unit is input to the entry of the dictionary buffer 45111 (step S11). For example, the latest data unit is input to an entry corresponding to an index indicating 0.

Each of the plurality of comparators 45112 compares two data units, and transmits a result to the match length calculation circuit 45113 (step S12).

Each of the plurality of match length calculation circuits 45113 calculates a match length based on the result received in S12 (step S13). Each of the plurality of match length calculation circuits 45113 transmits the calculated match length to the corresponding intermediate match candidate selection circuit 45115.

Each of the plurality of intermediate match candidate selection circuits 45115 selects one intermediate match candidate from the plurality of received match lengths (step S14). Each of the plurality of intermediate match candidate selection circuits 45115 selects, for example, the longest match length among the plurality of received match lengths as an intermediate match candidate. When there are two or longest match lengths, the intermediate match candidate selection circuit 45115 selects a match length corresponding to the shortest distance among the longest match lengths as an intermediate match candidate. Then, each of the plurality of intermediate match candidate selection circuits 45115 transmits the selected intermediate match candidate to the intermediate match candidate generation circuit 45116.

Each of the plurality of intermediate match candidate generation circuits 45116 determines whether or not it is satisfied that the distance of the received intermediate match candidate is the same as the distance of the intermediate match candidate of one previous cycle and that the match length of the received intermediate match candidate is larger than 0 (step S15).

When the distance of the received intermediate match candidate is the same as the distance of the intermediate match candidate of the previous cycle and the match length of the received intermediate match candidate is larger than 0 (Yes in S15), the intermediate match candidate generation circuit 45116 increments the match length of the intermediate match candidate by 1 (step S16).

When the distance of the received intermediate match candidate is different from the distance of the intermediate match candidate of one previous cycle, or when the match length of the received intermediate match candidate is 0 (No in S15), the intermediate match candidate generation circuit 45116 records the match length of the received intermediate match candidate (step S17).

Then, each of the plurality of intermediate match candidate generation circuits 45116 transmits an intermediate match candidate to the match candidate selection circuit 45114.

The match candidate selection circuit 45114 selects a match candidate from the received intermediate match candidates (step S18).

As described above, according to the data compression circuit 451 of the first embodiment, each of the number of match length calculation circuits 45113 corresponding to the upper limit of the index of the dictionary buffer 45111 calculates the match length with a narrow bit width (for example, 4 bits). The intermediate match candidate selection circuit 45115 selects M intermediate match candidates from the calculated N match lengths. Then, the intermediate match candidate generation circuit 45116 calculates a match length with a wide bit width (for example, 8 bits) for each of the selected intermediate match candidates.

Here, it is assumed that N is 2048 and M is 128. At this time, in a case where each of the 2048 match length calculation circuits performs calculation with a bit width of 8 bits, a circuit including a register capable of holding data corresponding to 8 bits×2048 is required.

On the other hand, in the data compression circuit according to the first embodiment, since each of the 2048 match length calculation circuits 45113 performs calculation with a bit width of 4 bits, a circuit including a register capable of holding data equivalent to 4 bits×2048 is required. In addition, since each of the 128 intermediate match candidate generation circuits 45116 performs calculation with a bit width of 8 bits, a circuit including a register capable of holding data corresponding to 8 bits×128 is additionally required. However, for the circuit area that can be reduced, the additional circuit area required to generate the intermediate match candidate is very small. Therefore, the data compression circuit 451 according to the first embodiment can reduce the circuit area.

Here, a case where the match length calculation circuit 45113 calculates the match length with a bit width of 4 bits and the intermediate match candidate generation circuit 45116 calculates the match length with a bit width of 8 bits has been described. However, the match length calculation circuit 45113 may calculate the match length using an A-bit register, and the intermediate match candidate generation circuit 45116 may calculate the match length using a B-bit register. At this time, B is an integer larger than A.

Second Embodiment

In general, with dictionary-based encoding, the closer the distance to the most recent data unit is, the more likely it will match. Then, in the dictionary-based encoding for generating the intermediate match candidate described in the first embodiment, for example, when a match length that has not been selected as an intermediate match candidate in the previous cycle is newly selected as an intermediate match candidate, if the match length has already reached the upper limit value in the match length calculation circuit, it is not possible to calculate the match length corresponding to the saturation addition, resulting in incomplete compression.

Therefore, the data compression circuit 451 according to the second embodiment calculates the match length with a wide bit width as in the comparative example at a position where the distance having a high possibility of matching is less than a certain distance, and generates intermediate match candidates as in the first embodiment at a position where the distance is equal to or greater than the certain distance.

Most of the configuration of the data compression circuit 451 according to the second embodiment is similar to that of the data compression circuit 451 according to the first embodiment. Hereinafter, a description will be given focusing on a difference from the data compression circuit 451 according to the first embodiment.

FIG. 9 is a diagram illustrating data compression processing executed by a data compression circuit according to the second embodiment.

Each of the match length calculation (MLC) circuits 45113-1 to 45113-N calculates a match length based on the result output by the corresponding comparator 45112-1 to 45112-N. Among the match length calculation (MLC) circuits 45113-1 to 45113-N in the second embodiment, the match length calculation (MLC) circuit 45113 corresponding to a distance equal to or longer than a threshold value calculates a match length using an A-bit register, and the match length calculation (MLC) circuit 45113 corresponding to a distance less than the threshold value calculates a match length using a B-bit register. B is an integer larger than A. For example, A is 4 and B is 8. Further, FIG. 9 illustrates a case where the threshold value is 17.

That is, the match length calculation (MLC) circuits 45113-1 to 45113-16 according to the second embodiment have the same configuration as the match length calculation circuit 45113A according to the comparative example, and the match length calculation (MLC) circuits 45113-17 to 45113-N according to the second embodiment have the same configuration as the match length calculation circuit (MLC) 45113 according to the first embodiment.

Each of the match length calculation (MLC) circuits 45113-1 to 45113-16 transmits the match length stored in the register to the match candidate selection circuit 45114-1 for each cycle. The match length stored in the register is, for example, a match length calculated with a bit width of 8 bits.

The match candidate selection circuit 45114-1 selects one match candidate from the plurality of received match lengths. The match candidate selection circuit 45114-1 selects the maximum match length as a match candidate. In a case where there are two or more maximum match lengths, the match candidate selection circuit 45114-1 selects, for example, a match length having the shortest distance among the maximum match lengths as a match candidate. The match candidate selection circuit 45114-1 transmits the selected match candidate to match candidate selection circuit 45114-2.

Also, each of the match length calculation (MLC) circuits 45113-17 to 45113-N transmits the match length stored in the register to the corresponding intermediate match candidate (IMC) selection circuit 45115 for each cycle. The match length stored in the register is, for example, a match length calculated with a bit width of 4 bits. For example, when the maximum value N of the index is 2048 and the number M of the intermediate match candidate (IMC) selection circuits 45115 and the intermediate match candidate (IMC) generation circuits 45116 is 127, 16 match length calculation (MCL) circuits 45113 correspond to one intermediate match candidate (IMC) selection circuit 45115. Specifically, each of the match length calculation (MLC) circuits 45113-17 to 45113-32 outputs the match length to the intermediate match candidate (IMC) selection circuit 45115-1. Although not illustrated, each of the match length calculation (MLC) circuits 45113-33 to 45113-64 outputs the match length to the intermediate match candidate (IMC) selection circuit 45115-2. Further, each of the match length calculation (MLC) circuits 45113-2033 to 45113-N (2048) outputs the match length to the intermediate match candidate (IMC) selection circuit 45115-M (127).

Each of the intermediate match candidate (IMC) selection circuits 45115-1 to 45115-M selects one match candidate from the input match lengths, and outputs the length of the selected match length and the distance corresponding to the selected match length to each of the intermediate match candidate (IMC) generation circuits 45116-1 to 45116-M.

Each of the intermediate match candidate (IMC) generation circuits 45116-1 to 45116-M generates an intermediate match candidate based on the input match length and the input distance.

Then, the intermediate match candidate (IMC) generation circuit 45116 transmits the match length (Length) stored in the register and the distance (X) stored in the register 451161 to the match candidate selection circuit 45114-2 for each cycle. The match length of the output intermediate match candidate is, for example, a match length calculated with a bit width of 8 bits.

The match candidate selection circuit 45114-2 selects one match candidate from among the match candidates received from the match candidate selection circuit 45114-1 and a plurality of intermediate match candidates received from each of the intermediate match candidate (IMC) generation circuits 45116-1 to 45116-M. For example, the match candidate selection circuit 45114-2 selects, as a match candidate, a match candidate including a longest match length among the match candidate and the plurality of intermediate match candidates. When there are two or more longest match lengths, the match candidate selection circuit 45114 selects one including the longest match length and corresponding to the shortest distance as a match candidate.

Then, the match candidate processing circuit 45117 and the unmatched input data insertion circuit 45118 generate compressed data based on the match candidate selected by the match candidate selection circuit 45114-2.

Figure 10:
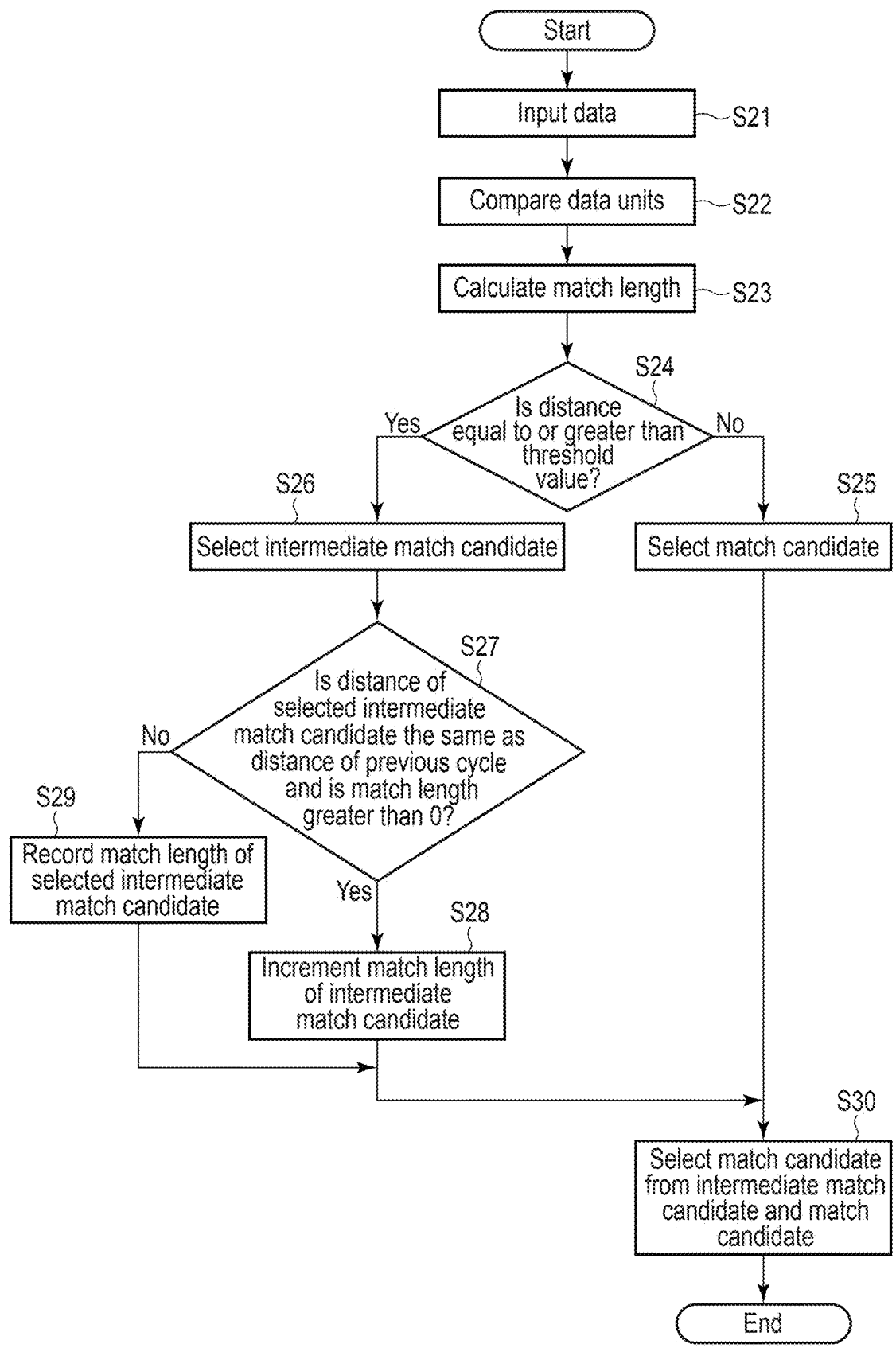
FIG. 10 is a flowchart illustrating a procedure of data compression processing executed by the data compression circuit according to the second embodiment.

Next, a procedure of processing executed in each cycle in the data compression processing in the second embodiment will be described. FIG. 10 is a flowchart illustrating a procedure of data compression processing executed by the data compression circuit according to the second embodiment. With the start of the cycle, the data compression processing is started.

First, one data unit is input to the entry of the dictionary buffer 45111 (step S21). For example, the latest data unit is input to an entry corresponding to an index indicating 0.

Each of the plurality of comparators 45112 compares two data units, and transmits a result to the match length calculation circuit 45113 (step S22).

Each of the plurality of match length calculation circuits 45113 calculates a match length based on the result received in S22 (step S23). Here, the match length calculation circuit in which the distance is less than the threshold value calculates the match length with a wide bit width (for example, 8 bits). In addition, the match length calculation circuit having a distance equal to or longer than the threshold value calculates the match length with a narrow bit width (for example, 4 bits).

Here, for the plurality of match length calculation circuits 45113, based on whether or not the distance corresponding to each match length calculation circuit 45113 is equal to or longer than the threshold value, the procedure of step S25 or step S26 is started (step S24).

Each of the two or more match length calculation circuits 45113 whose distance is less than the threshold value (No in step S24) transmits the calculated match length to the match candidate selection circuit 45114-1.

The match candidate selection circuit 45114-1 that has received the match length selects one match candidate from the received match length (step S25). For example, the match candidate selection circuit 45114-1 selects the longest match length among a plurality of received match lengths as a match candidate. In a case where there are two or more longest match lengths, the match candidate selection circuit 45114-1 selects a match length having the shortest distance among the longest match lengths as a match candidate. Then, each of the match candidate selection circuits 45114-1 transmits the selected match candidate to match candidate selection circuit 45114-2.

Each of the two or more match length calculation circuits 45113 whose distance is equal to or longer than the threshold value (Yes in step S24) transmits the calculated match length to the corresponding intermediate match candidate selection circuit 45115.

Each of the plurality of intermediate match candidate selection circuits 45115 selects one intermediate match candidate from the plurality of received match lengths (step S26). Each of the plurality of intermediate match candidate selection circuits 45115 selects, for example, the longest match length among the plurality of received match lengths as an intermediate match candidate. When there are two or more longest match lengths, the intermediate match candidate selection circuit 45115 selects a match length having the shortest distance among the longest match lengths as an intermediate match candidate. Then, each of the plurality of intermediate match candidate selection circuits 45115 transmits the selected intermediate match candidate to the intermediate match candidate generation circuit 45116.

Each of the plurality of intermediate match candidate generation circuits 45116 determines whether or not it is satisfied that the distance of the received intermediate match candidate is the same as the distance of the intermediate match candidate of the previous cycle and that the match length of the received intermediate match candidate is larger than 0 (step S27).

When the distance of the received intermediate match candidate is the same as the distance of the intermediate match candidate of the previous cycle and the match length of the received intermediate match candidate is larger than 0 (Yes in S27), the intermediate match candidate generation circuit 45116 increments the match length of the intermediate match candidate by 1 (step S28).

When the distance of the received intermediate match candidate is different from the distance of the intermediate match candidate of the previous cycle, or when the match length of the received intermediate match candidate is 0 (No in S27), the intermediate match candidate generation circuit 45116 records the match length of the received intermediate match candidate (step S28).

Then, each of the plurality of intermediate match candidate generation circuits 45116 transmits an intermediate match candidate to the match candidate selection circuit 45114-2.

The match candidate selection circuit 45114 selects one match candidate from the match candidates received from the match candidate selection circuit 45114-1 in S25 and the plurality of intermediate match candidates received from the intermediate match candidate generation circuits 45116 in S28 and S29 (step S30).

As described above, in the data compression circuit 451 according to the second embodiment, at a position where the distance is less than a certain distance, the match length calculation circuit 45113 can calculate the match length with a wide bit width. Then, at a position where the distance is equal to or more than a certain value, similarly to the data compression circuit according to the first embodiment, it is possible to generate an intermediate match candidate with a wide bit width after calculating the match length with a narrow bit width.

As a result, it is possible to avoid deterioration of compression performance at a short distance at which a match is likely to be made. In addition, since the bit width used for the calculation of the match length calculation circuit at the position where the distance is equal to or more than a certain distance can be halved, the circuit area can be reduced.

Third Embodiment

In the third embodiment, it is assumed that data of 2 bytes or more is stored in the dictionary buffer 45111 for each cycle. That is, two or more data units are input to the dictionary buffer 45111 in one cycle. The data compression circuit 451 according to the third embodiment determines whether or not each of the plurality of data units newly stored in the dictionary buffer 45111 is matched with each of the data units stored in the dictionary buffer 45111 before each data unit. In the following description, it is assumed that 4-byte data is stored in the dictionary buffer 45111 every cycle. However, the size of the data stored in the dictionary buffer 45111 for each cycle may be 2 bytes or 3 bytes, or may be 5 bytes or more.

Most of the configuration of the data compression circuit 451 according to the third embodiment is similar to that of the data compression circuit 451 according to the first embodiment. Hereinafter, a description will be given focusing on a difference from the data compression circuit 451 according to the first embodiment.

FIG. 11 is a diagram illustrating data compression processing executed by a data compression circuit according to the third embodiment.

The dictionary buffer 45111 is stored in an entry corresponding to an index in which the latest data unit indicates 0. For example, when four data units (that is, 4 bytes of data) are stored in the dictionary buffer 45111 every cycle, the data unit stored in each entry is shifted to an entry corresponding to an index larger by 4. That is, the data unit stored in the entry corresponding to 0 is shifted to the entry corresponding to 4 when one cycle elapses.

The data compression circuit according to the third embodiment includes a plurality of comparators 45112-01 to 45112-3N. Each of the comparators 45112 compares two data units. The comparator 45112-IJ compares the data unit stored in the entry corresponding to I and the data unit stored in the entry corresponding to J. Specifically, the comparator 45112-01 compares the data unit stored in the entry corresponding to 0 and the data unit stored in the entry corresponding to 1. The comparator 45112-02 compares the data unit stored in the entry corresponding to 0 and the data unit stored in the entry corresponding to 2. The comparator 45112-37 compares the data unit stored in the entry corresponding to 3 and the data unit stored in the entry corresponding to 7.

Then, each of the plurality of comparators 45112 transmits the result to the corresponding match length calculation (MLC) circuit 45113. Each of the plurality of comparators 45112 transmits the result to the match length calculation (MLC) circuit 45113 corresponding to the same distance. The comparator 45112-IJ corresponds to the distance (J-I). Therefore, the comparator 45112-IJ transmits the result to the match length calculation (MLC) circuit 45113-(J-I). Specifically, the comparators 45112-01, 12, 23, and 34 transmit the results to the match length calculation (MLC) circuit 45113-1. The comparators 45112-02, 13, 24, and 35 transmit results to the match length calculation (MLC) circuit 45113-2. The comparators 45112-03, 14, 25, and 36 transmit results to the match length calculation (MLC) circuit 45113-3. The comparators 45112-04, 15, 26, and 37 transmit results to the match length calculation (MLC) circuit 45113-4.

Each of the match length calculation (MLC) circuits 45113 calculates a match length based on the results received from the corresponding four comparators 45112.

Figure 12:
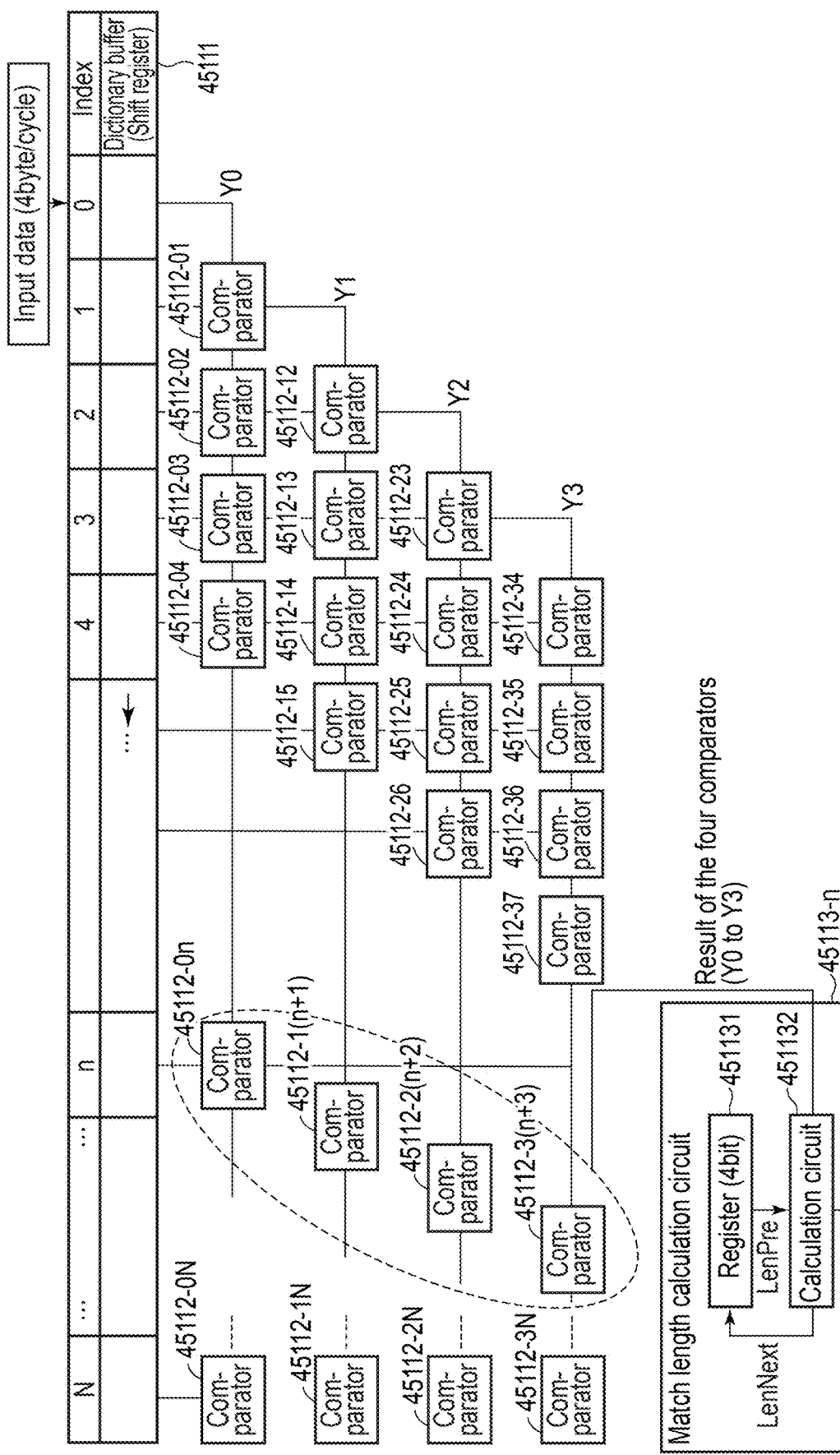
FIG. 12 is a diagram illustrating a configuration example of a match length calculation circuit included in a data compression circuit according to the third embodiment.

A configuration example of the match length calculation circuit 45113 will be described with reference to FIG. 12. FIG. 12 is a diagram illustrating a configuration example of a match length calculation circuit 45113 included in a data compression circuit according to the third embodiment. FIG. 12 illustrates the configuration of the match length calculation circuit 45113-n. The other match length calculation circuits 45113 also have the same configuration as the match length calculation circuit 45113-n.

The match length calculation circuit 45113-n includes a register 451131 and a calculation circuit 451132.

The register 451131 is a 4-bit register that temporarily stores the latest match length.

The calculation circuit 451132 outputs a match candidate including the distance, the match length, and the latest end of the match range based on the results of the corresponding four comparators.

The match length calculation circuit 45113-n receives the respective results Y0 to Y3 of the comparators 45112-0n, 1(n+1), 2(n+2), and 3(n+3). The result Y0, which is the result of the comparator 45112-0n, indicates 1 when the data unit stored in the entry corresponding to 0 matches the data unit stored in the entry corresponding to n, and indicates 0 when they do not match. The result Y1, which is the result of the comparator 45112-1(n+1), indicates 1 when the data unit stored in the entry corresponding to 1 matches the data unit stored in the entry corresponding to n+1, and indicates 0 when they do not match. The result Y2, which is the result of the comparator 45112-2(n+2), indicates 1 when the data unit stored in the entry corresponding to 2 matches the data unit stored in the entry corresponding to n+2, and indicates 0 when they do not match. The result Y3, which is the result of the comparator 45112-3(n+3), indicates 1 when the data unit stored in the entry corresponding to 3 matches the data unit stored in the entry corresponding to n+3, and indicates 0 when they do not match.

The calculation circuit 451132 of the match length calculation circuit 45113-n executes the match length calculation based on the received results Y0 to Y3. The match length calculation by the calculation circuit 451132 will be described with reference to FIG. 13. Hereinafter, an input to the calculation circuit 451132 is represented by an input (Y3, Y2, Y1, Y0), and an output returned by the calculation circuit 451132 is represented by an output (Ypos, Len, LenNext). Ypos is the latest end of the match length, Len is the match length, and LenNext is the carryover match length. The carryover match length is a match length that can be added to the match length in the next cycle.

For example, the calculation circuit 451132 returns an output (0, 0, 0) to an input (0, 0, 0, 0). In the case of an input of another pattern, the calculation circuit 451132 returns an output corresponding to the input as described in FIG. 13.

The latest end Ypos of the match range indicates a position corresponding to the latest end of the match length continuous from the match length of one previous cycle among the plurality of indexes from which the result is output in the current cycle.

LenPre is the match length carried over in the previous cycle. The calculation circuit 451132 acquires the carried match length LenPre from the register 451131 as necessary.

The value output as the carryover match length LenNext by the calculation circuit 451132 is stored in the register 451131. The carryover match length LenNext stored in the register 451131 is used as the carryover match length LenPre in the next cycle.

Then, the match length calculation circuit 45113-n transmits a match candidate including the distance X (=n), the match length Len, and the latest end Ypos of the match length to the corresponding intermediate match candidate selection circuit 45115 based on the calculation result by the calculation circuit 451132. The description refers back to FIG. 11.

Each of the intermediate match candidate selection circuits 45115-1 to 45115-M selects one match candidate from the received match length, and outputs the selected match candidate to each of the intermediate match candidate generation circuits 45116-1 to 45116-M.

Each of the intermediate match candidate generation circuits 45116-1 to 45116-M generates an intermediate match candidate based on the distance X, the match length Len, and the latest end Ypos of the match length included in the input match candidate.

Figure 14:
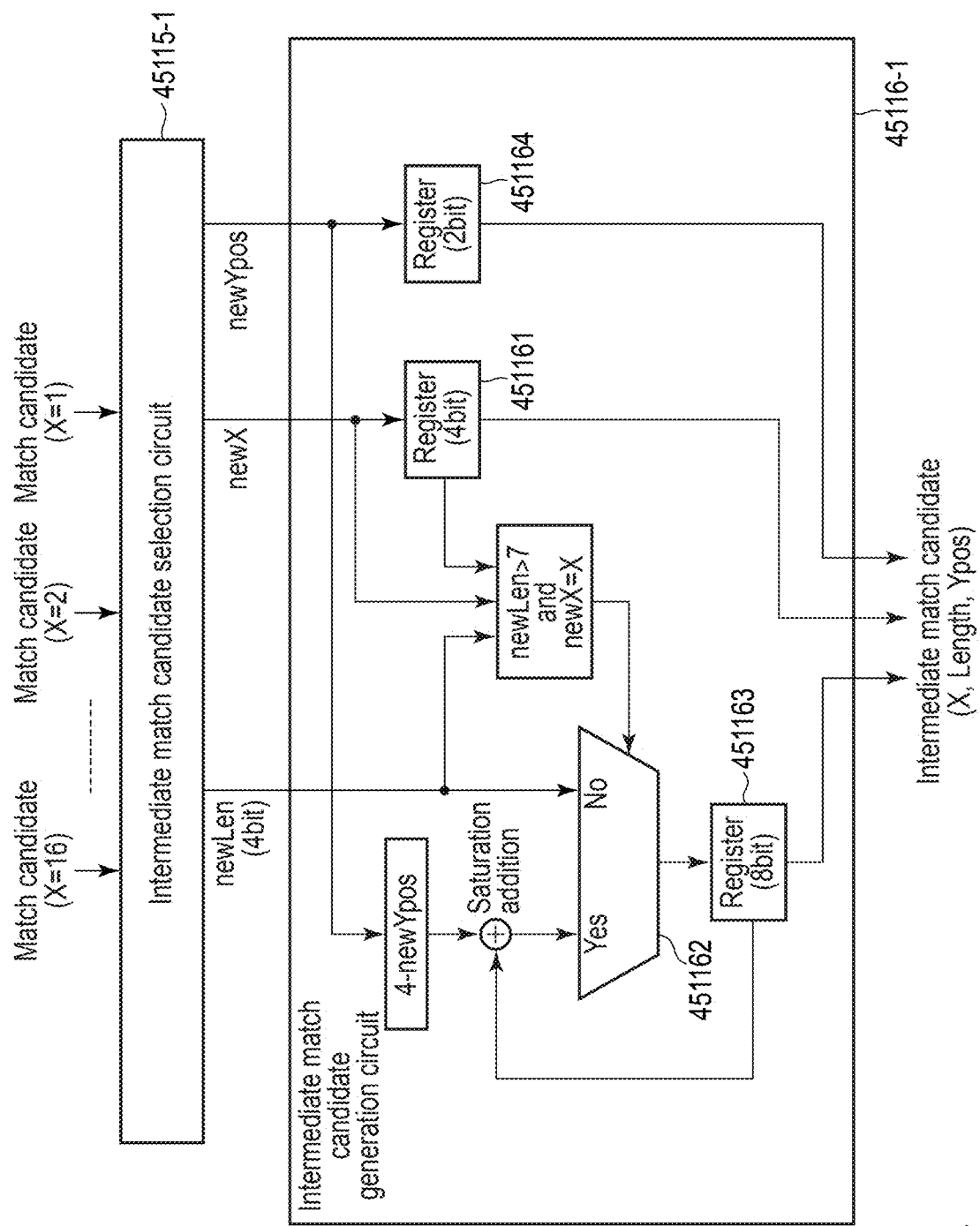
FIG. 14 is a diagram illustrating a configuration example of an intermediate match candidate generation circuit included in the data compression circuit according to the third embodiment.

A configuration of the intermediate match candidate generation circuit 45116 will be described with reference to FIG. 14. FIG. 14 is a diagram illustrating a configuration example of an intermediate match candidate generation circuit included in the data compression circuit according to the third embodiment. FIG. 14 illustrates the intermediate match candidate generation circuit 45116-1. Each of the intermediate match candidate generation circuits 45116-2 to 45116-N has the same configuration as the intermediate match candidate generation circuit 45116-1.

The intermediate match candidate generation circuit 45116-1 according to the third embodiment includes a register 451161, a selector 451162, a register 451163, and a register 451164.

The register 451161 is a register that temporarily stores the distance X of the intermediate match candidate. The register 451161 temporarily stores, for example, 4-bit data.

The selector 451162 determines the update of the intermediate match candidate based on the result of the determination as to whether or not the distance of the latest intermediate match candidate and the distance of the intermediate match candidate of the previous cycle are the same and the match length of the intermediate match candidate is greater than 7. Here, the threshold value to be compared with the match length of the intermediate match candidate may be 4 or more, which is a value with which it can be determined that the match range is continuous from the previous cycle. When the threshold value is 7, the selector 451162 may determine only the value of the most significant bit of the match length newLen. In addition, the threshold value may be 4 or more and a value of a power of 2.

The register 451163 is a register that temporarily stores the length of the latest intermediate match candidate. The register 451163 temporarily stores, for example, 8-bit data.

The register 451134 is a register that temporarily stores the latest end of the match length. The register 451164 temporarily stores, for example, 2-bit data.

The intermediate match candidate generation circuit 45116-1 receives the length of the match candidate (newLen), the distance (newX), and the latest end of the match length (newYpos) from intermediate match candidate selection circuit 45115-1 for each cycle. The length newLen of the match candidate is 4-bit data. The distance newX is also 4-bit data. In addition, the latest end newYpos of the match length is 2-bit data.

The received latest distance newX is stored in the register 451161.

The received latest end newYpos of the match length is stored in the register 451164.

Based on the length newLen and the distance newX of the received latest intermediate match candidate and the distance X stored in the register 451161, the intermediate match candidate generation circuit 45116-1 determines whether or not the condition that newX and X are the same and newLen is greater than 7 is satisfied.

When the above condition is not satisfied, the selector 451162 selects the newLen and outputs the newLen to the register 451163. As a result, the match length becomes the same value as the newLen.

When the above condition is satisfied, the selector 451162 selects the saturation-added match length. This match length is a value obtained by adding 4-newYpos to the match length previously stored in the register 451163. When the match length stored in register 451163 is the upper limit value, the upper limit value is maintained. Then, the saturation-added match length is stored in the register 451163.

Then, the intermediate match candidate generation circuit 45116 transmits, for each cycle, the match length (Length) stored in the register 451163, the distance (X) stored in the register 451161, and the latest end (Ypos) of the match length stored in the register 451161.

The description refers back to FIG. 11 again. The match candidate selection circuit 45114 selects one match candidate from a plurality of intermediate match candidates received from each of the intermediate match candidate generation circuits 45116-1 to 45116-M. For example, the match candidate selection circuit 45114 selects, as a match candidate, an intermediate match candidate including a longest match length among a plurality of intermediate match candidates. When there are two or more longest match lengths, the match candidate selection circuit 45114 selects an intermediate match candidate including the longest match length and corresponding to the shortest distance as a match candidate.

The match candidate processing circuit 45117 and the unmatched input data insertion circuit 45118 generate compressed data based on the match candidate selected by the match candidate selection circuit 45114.

Figure 15:
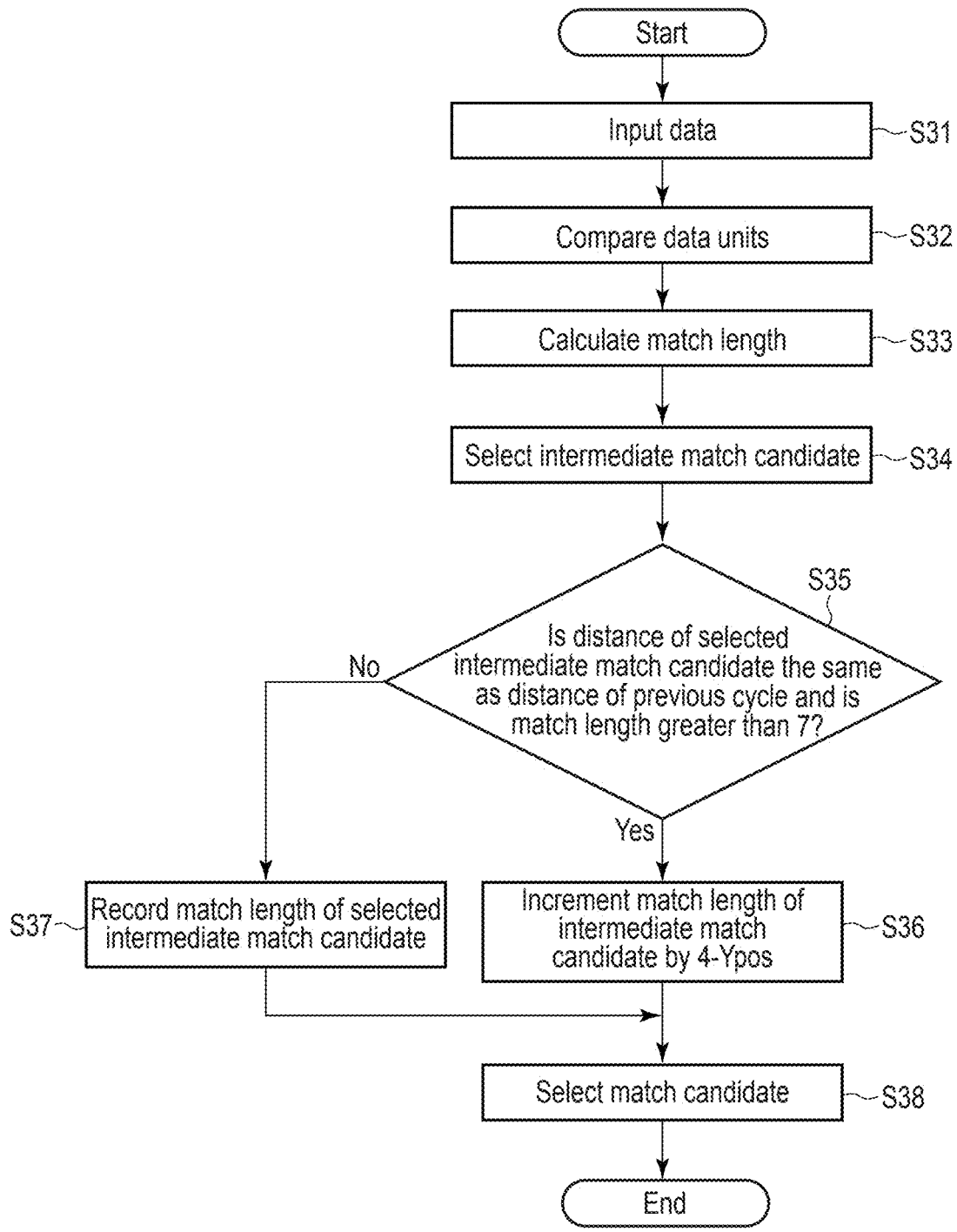
FIG. 15 is a flowchart illustrating a procedure of data compression processing executed by the data compression circuit according to the third embodiment.

Next, a procedure of processing executed in each cycle in the data compression processing in the third embodiment will be described. FIG. 15 is a flowchart illustrating a procedure of data compression processing executed by the data compression circuit according to the third embodiment. With the start of the cycle, the data compression processing is started.

First, a plurality of data unit is input to the entry of the dictionary buffer 45111 (step S31). For example, the latest data unit is input to each of the entries corresponding to an index indicating 0 to 3.

Each of the plurality of comparators 45112 compares two data units, and transmits a result to the match length calculation circuit 45113 (step S32). For each of the data units input in S31, it is determined whether or not the data unit is matched with the data unit already stored in the dictionary buffer 45111 for each distance.

Each of the plurality of match length calculation circuits 45113 calculates a match length based on the result received in S32 (step S33). Each of the plurality of match length calculation circuits 45113 transmits the calculated match length to the corresponding intermediate match candidate selection circuit 45115.

Each of the plurality of intermediate match candidate selection circuits 45115 selects one intermediate match candidate from the plurality of received match lengths (step S34). Each of the plurality of intermediate match candidate selection circuits 45115 selects, for example, the longest match length among the plurality of received match lengths as an intermediate match candidate. When there are two or more longest match lengths, the intermediate match candidate selection circuit 45115 selects a match length having the shortest distance among the longest match lengths as an intermediate match candidate. Then, each of the plurality of intermediate match candidate selection circuits 45115 transmits the selected intermediate match candidate to the intermediate match candidate generation circuit 45116.

Each of the plurality of intermediate match candidate generation circuits 45116 determines whether or not it is satisfied that the distance of the received intermediate match candidate is the same as the distance of the intermediate match candidate of the previous cycle and that the match length of the received intermediate match candidate is larger than 7 (step S35).

When the distance of the received intermediate match candidate is the same as the distance of the intermediate match candidate of the previous cycle and the match length of the received intermediate match candidate is larger than 7 (Yes in S35), the intermediate match candidate generation circuit 45116 increments the match length of the intermediate match candidate by (4−(the latest end Ypos of the match range)) (step S36).

When the distance of the received intermediate match candidate is different from the distance of the intermediate match candidate of the previous cycle, or when the match length of the received intermediate match candidate is 7 or less (No in S35), the intermediate match candidate generation circuit 45116 records the match length of the received intermediate match candidate (step S37).

Then, each of the plurality of intermediate match candidate generation circuits 45116 transmits an intermediate match candidate to the match candidate selection circuit 45114.

The match candidate selection circuit 45114 selects a match candidate from the received intermediate match candidates (step S38).

As described above, according to the data compression circuit 451 of the third embodiment, even in a case where the number of data units input to the dictionary buffer 45111 per cycle is two or more, it is possible to achieve a configuration in which the intermediate match candidate is generated with a wide bit width after the match length calculation is executed with a narrow bit width as in the first embodiment.

Also in the third embodiment, similarly to the data compression circuit according to the first embodiment, since each of the 2048 match length calculation circuits 45113 performs calculation with a bit width of 4 bits, a circuit including a register capable of storing data equivalent to 4 bits×2048 is required. In addition, since each of the 128 intermediate match candidate generation circuits 45116 performs calculation with a bit width of 8 bits, a circuit including a register capable of holding data corresponding to 8 bits×128 is additionally required. On the other hand, since the bit width in each of the 2048 match length calculation circuits 45113 is halved, the reduction amount of the circuit area is large, and thus, the data compression circuit 451 according to the third embodiment can reduce the circuit area.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A data compression circuit configured to compress first data which is input data, the data compression circuit comprising:

a buffer including a plurality of registers each storing a 1-byte data unit, one or more first registers in which data units included in the first data are sequentially stored for each cycle being included in the plurality of registers;

a plurality of comparators, each of the plurality of comparators corresponding to a distance between the one or more first registers and a register that stores a data unit of an earlier storage order than the data unit stored in the first register, each of the plurality of comparators comparing a data unit stored in the one or more first registers and a data unit in the earlier storage order;

a plurality of match length calculation circuits, each of the plurality of match length calculation circuits corresponding to one or more comparators among the plurality of comparators, each of the plurality of match length calculation circuits calculating a match length based on a result received from the corresponding one or more comparators;

a plurality of intermediate match candidate selection circuits, each of the plurality of intermediate match candidate selection circuits corresponding to two or more match length calculation circuits among the plurality of match length calculation circuits, each of the plurality of intermediate match candidate selection circuits selecting a match length from two or more match lengths received from the two or more corresponding match length calculation circuits; and a plurality of intermediate match candidate generation circuits, each of the plurality of intermediate match candidate generation circuits corresponding to an intermediate match candidate selection circuit among the plurality of intermediate match candidate selection circuits, each of the plurality of intermediate match candidate generation circuits generating an intermediate match candidate based on the match length selected by the corresponding intermediate match candidate selection circuit, wherein each of the intermediate match candidate generation circuits is configured to calculate a match length with a bit width larger than a bit width of the match length calculation circuits, and each of the plurality of intermediate match candidate generation circuits is configured to:

generate an intermediate match candidate by incrementing, based on a match length received from the corresponding intermediate match candidate selection circuit, a match length corresponding to an intermediate match candidate generated in a previous cycle when a distance corresponding to the received match length matches a distance corresponding to the intermediate match candidate generated in the previous cycle and the received match length is greater than a threshold value; and generate the received match length as a new intermediate match candidate when the distance corresponding to the received match length does not match the distance corresponding to the intermediate match candidate generated in the previous cycle, or when the received match length is equal to or less than the threshold value.

2. The data compression circuit according to claim 1, wherein
each of the plurality of match length calculation circuits is configured to correspond to one of the plurality of intermediate match candidate selection circuits,
for each cycle,
one data unit of the first data is input to a first register of the buffer,
each of the plurality of match length calculation circuits is configured to add 1 to the match length when a result of a corresponding one of the plurality of comparators indicates matched; and reset the match length when the result of the corresponding one of the plurality of comparators indicates unmatched, and
each of the plurality of intermediate match candidate generation circuits is configured to generate an intermediate match candidate by adding 1 to the intermediate match candidate generated in the previous cycle when the distance corresponding to the received match length matches a distance corresponding to the intermediate match candidate generated in the previous cycle and the received match length is greater than 0; and generate the received match length as the new intermediate match candidate when the distance corresponding to the received match length does not match the distance corresponding to the intermediate match candidate generated in the previous cycle, or when the received match length is 0.

3. The data compression circuit according to claim 2, further comprising:
a match candidate selection circuit configured to select an intermediate match candidate as a match candidate from a plurality of intermediate match candidates generated by the plurality of intermediate match candidate generation circuits.

4. The data compression circuit according to claim 1, wherein
each of one or more first match length calculation circuits corresponding to a distance equal to or longer than a first distance among the plurality of match length calculation circuits corresponds to one of the plurality of intermediate match candidate selection circuits, and
each of one or more second match length calculation circuits corresponding to a distance less than the first distance among the plurality of match length calculation circuits is configured to calculate a match length using the same bit width as a bit width of each of the plurality of intermediate match candidate generation circuits, and
the data compression circuit further comprises:
a first match candidate selection circuit configured to select a match candidate from one or more match lengths calculated by the one or more second match length calculation circuits; and
a second match candidate selection circuit configured to select a match candidate from the selected match candidate and a plurality of intermediate match candidates generated by the plurality of intermediate match candidate generation circuits.

5. The data compression circuit according to claim 1, wherein
N data units of the first data are input to the buffer for each cycle,
the N is an integer of 2 or more, and
each of the plurality of intermediate match candidate generation circuits is configured to generate a match length corresponding to the intermediate match candidate based on the selected match length and a latest end of the match length.

6. The data compression circuit according to claim 5, further comprising:
a match candidate selection circuit configured to select an intermediate match candidate as a match candidate from a plurality of intermediate match candidates generated by the plurality of intermediate match candidate generation circuits.

7. The data compression circuit according to claim 5, wherein
each of the plurality of intermediate match candidate generation circuits is configured to:
generate an intermediate match candidate by adding a first value to a match length corresponding to the intermediate match candidate generated in the previous cycle when the distance corresponding to the received match length matches the distance corresponding to the intermediate match candidate generated in the previous cycle and the received match length is greater than the N, the first value being a value based on the received match length and a latest end of the received match length, and
generate the received match length as a new intermediate match candidate when the distance corresponding to the received match length does not match the distance corresponding to the intermediate match candidate generated in the previous cycle, or when the received match length is the N or less.

8. The data compression circuit according to claim 5, wherein
each of the plurality of intermediate match candidate generation circuits is configured to:
generate an intermediate match candidate by adding a first value to a match length corresponding to the intermediate match candidate generated in the previous cycle when the distance corresponding to the received match length matches the distance corresponding to the intermediate match candidate generated in the previous cycle and the received match length is equal to or greater than M, the first value being a value based on the received match length and a latest end of the received match length, the M being a value of a power of 2, which is greater than the N; and
generate the received match length as a new intermediate match candidate when the distance corresponding to the received match length does not match the distance corresponding to the intermediate match candidate generated in the previous cycle, or when the received match length is less than the M.

9. A memory system comprising:
a nonvolatile memory; and
a memory controller including the data compression circuit according to claim 1 and being configured to control the nonvolatile memory, wherein
the data compression circuit further comprises:
a match candidate processing circuit configured to process the first data based on a selected match candidate;
an unmatched input data insertion circuit configured to insert unmatched data into the processed data; and
an entropy encoding circuit configured to generate compressed data by entropy encoding the processed data into which the unmatched data is inserted, and the memory controller is configured to write the generated compressed data to the nonvolatile memory.

10. A method of controlling a data compression circuit that compresses first data which is input data, the method comprising:

for each cycle,
sequentially storing one or more data units included in the first data in a buffer that includes a plurality of registers each storing a 1-byte data unit;
comparing, for each of distances in the buffer, each of the one or more data units and a data unit of an earlier storage order than each of the one or more data units;
calculating a plurality of match lengths corresponding to the distances by calculating a match length for each of the distances based on a result of the comparison;
selecting a match length from each of a plurality of groups, each of the plurality of groups including two or more match lengths among the plurality of match lengths, the selected match length being a longest match length among the two or more match lengths included in the same group;
generating, for each group, an intermediate match candidate by incrementing, based on the selected match length, a match length corresponding to an intermediate match candidate generated in a previous cycle when a distance corresponding to the selected match length matches a distance corresponding to the intermediate match candidate generated in the previous cycle and the selected match length is greater than a threshold value; and
generating, for each group, the selected match length as a new intermediate match candidate when the distance corresponding to the selected match length does not match the distance corresponding to the intermediate match candidate generated in the previous cycle, or when the selected match length is equal to or less than the threshold value.

11. The method according to claim 10, wherein
one data unit of the first data is input to the buffer for each cycle,
the calculating includes adding 1 to the match length when the result of the comparison indicates matched, and resetting the match length when the result of the comparison indicates unmatched,
the generating the intermediate match candidate includes generating an intermediate match candidate by adding 1 to an intermediate match candidate generated in the previous cycle when the distance corresponding to the selected match length matches a distance corresponding to the intermediate match candidate generated in the previous cycle and the selected match length is greater than 0, and
the generating the selected match length as the new intermediate match candidate includes generating the selected match length as the new intermediate match candidate when the distance corresponding to the selected match length does not match the distance corresponding to the intermediate match candidate generated in the previous cycle, or when the selected match length is 0.

12. The method according to claim 11, wherein
a plurality of intermediate match candidates corresponding to the plurality of groups are generated by generating the intermediate match candidate for each group, and the method further comprises:
selecting one of the plurality of intermediate match candidates as a match candidate.

13. The method according to claim 10, wherein
N data units of the first data are input to the buffer for each cycle,
the N is an integer of 2 or more, and
the method further comprises:
generating, for each group, a match length corresponding to the intermediate match candidate based on the selected match length and a latest end of the match length.

14. The method according to claim 13, wherein
a plurality of intermediate match candidates corresponding to the plurality of groups are generated by generating the intermediate match candidate for each group, and
the method further comprises:
selecting one of the plurality of intermediate match candidates as a match candidate.

15. The method according to claim 13, wherein
the generating the intermediate match candidate includes generating an intermediate match candidate by adding a first value to a match length corresponding to the intermediate match candidate generated in the previous cycle when the distance corresponding to the selected match length matches the distance corresponding to the intermediate match candidate generated in the previous cycle and the selected match length is greater than the N, the first value being a value based on the selected match length and a latest end of the selected match length, and
the generating the selected match length as the new intermediate match candidate includes generating the selected match length as the new intermediate match candidate when the distance corresponding to the selected match length does not match the distance corresponding to the intermediate match candidate generated in the previous cycle, or when the selected match length is the N or less.

16. The method according to claim 13, wherein
the generating the intermediate match candidate includes generating the intermediate match candidate by adding a first value to a match length corresponding to the intermediate match candidate generated in the previous cycle when the distance corresponding to the selected match length matches the distance corresponding to the intermediate match candidate generated in the previous cycle and the selected match length is equal to or greater than M, the first value being a value based on the selected match length and a latest end of the selected match length, the M being a value of a power of 2, which is greater than the N, and
the generating the selected match length as the new intermediate match candidate includes generating the selected match length as the new intermediate match candidate when the distance corresponding to the selected match length does not match the distance corresponding to the intermediate match candidate generated in the previous cycle, or when the selected match length is less than the M.

* * * * *